United States Patent
Fields et al.

(10) Patent No.: US 9,352,492 B2
(45) Date of Patent: *May 31, 2016

(54) INJECTION BLOW MOLDING SYSTEM WITH ENHANCED PARISON MOLD CONFIGURATION

(71) Applicant: R&D Tool & Engineering Co., Lee's Summit, MO (US)

(72) Inventors: Randal L. Fields, Greenwood, MO (US); Bruce A. Wardlow, Lee's Summit, MO (US); David A. Brunson, Lee's Summit, MO (US); Brian R. Lefebure, Lee's Summit, MO (US); James R. Baldwin, Liberty, MO (US)

(73) Assignee: R&D Tool & Engineering Co., Lee's Summit, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/821,490

(22) Filed: Aug. 7, 2015

(65) Prior Publication Data

US 2015/0343670 A1    Dec. 3, 2015

Related U.S. Application Data

(63) Continuation of application No. 14/057,667, filed on Oct. 18, 2013, now Pat. No. 9,132,581, which is a continuation-in-part of application No. 12/951,920, filed on Nov. 22, 2010, now Pat. No. 8,562,334.

(60) Provisional application No. 61/749,478, filed on Jan. 7, 2013.

(51) Int. Cl.
*B29C 45/26*    (2006.01)
*B29C 33/02*    (2006.01)

(Continued)

(52) U.S. Cl.
CPC ............ *B29C 33/301* (2013.01); *B29C 45/1743* (2013.01); *B29C 45/32* (2013.01);

(Continued)

(58) Field of Classification Search
CPC ............ B29B 11/08; B29C 2045/2683; B29C 2033/023
See application file for complete search history.

(56) References Cited

U.S. PATENT DOCUMENTS 2,331,687 A    10/1943  Hobson
2,353,825 A *   7/1944  Hofmann ............... B29C 45/03
                                              264/DIG. 33

(Continued)

FOREIGN PATENT DOCUMENTS

WO    WO 2007/021275    2/2007

OTHER PUBLICATIONS

Samuel L. Belcher, Practical Guide to Injection Blow Molding, Plastics Engineering Series, CRC Press Taylor & Francis Group, 2007, pp. 1-182, Boca Raton, Florida.

(Continued)

*Primary Examiner* — Robert B Davis
(74) *Attorney, Agent, or Firm* — Hovey Williams LLP

(57) ABSTRACT

An injection blow molding (IBM) system and method for forming a plurality of parisons and molded articles. The IBM system includes an injection station having upper and lower die sets and a plurality of upper and lower mold half blocks each attached to a respective die set. Each of the upper mold half blocks has a corresponding lower mold half block with which it cooperatively defines one or more cavities for forming the exterior shape of the body of one or more of the parisons. The individual, independent attachment of the mold half blocks to the die sets allows easy individual replacement of faulty or worn mold blocks. Further, such an independent attachment configuration also permits the mold half blocks of each die set to be spaced from one another, so as to reduce thermal expansion problems and ease dimensional tolerances required for the width of the mold half blocks.

17 Claims, 36 Drawing Sheets

(51) Int. Cl.
B29C 33/30 (2006.01)
B29C 49/06 (2006.01)
B29C 49/30 (2006.01)
B29C 45/17 (2006.01)
B29C 45/32 (2006.01)
B29C 49/48 (2006.01)
B29L 31/00 (2006.01)
B29K 105/00 (2006.01)
B29C 49/64 (2006.01)
B29C 49/78 (2006.01)

(52) U.S. Cl.
CPC ............ B29C 49/061 (2013.01); B29C 49/063 (2013.01); B29C 49/30 (2013.01); B29C 49/48 (2013.01); *B29C 49/6427* (2013.01); *B29C 49/786* (2013.01); *B29C 2049/4887* (2013.01); *B29K 2105/258* (2013.01); *B29L 2031/712* (2013.01)

(56) References Cited

U.S. PATENT DOCUMENTS

| | | | |
|---|---|---|---|
| 2,853,736 A | 9/1958 | Gussoni | |
| 2,974,362 A * | 3/1961 | Knowles | B29C 49/064 425/533 |
| 3,137,748 A | 6/1964 | Makowski | |
| 3,480,993 A | 12/1969 | Schjeldahl et al. | |
| 3,559,245 A | 2/1971 | Ryan | |
| 3,579,725 A | 5/1971 | Hansen et al. | |
| 3,635,635 A | 1/1972 | Moslo | |
| 3,776,991 A | 12/1973 | Marcus | |
| 3,941,539 A | 3/1976 | Saumsiegle et al. | |
| 3,947,176 A | 3/1976 | Rainville | |
| 3,988,100 A | 10/1976 | Julien | |
| 4,018,860 A | 4/1977 | Farrell | |
| 4,063,867 A | 12/1977 | Janniere | |
| 4,131,410 A | 12/1978 | Aoki | |
| 4,174,934 A | 11/1979 | Valyi | |
| 4,201,535 A | 5/1980 | Ninneman | |
| 4,435,147 A | 3/1984 | Myers et al. | |
| 4,828,473 A | 5/1989 | Otake et al. | |
| 4,941,815 A | 7/1990 | Julian | |
| 5,062,784 A | 11/1991 | Inaba et al. | |
| 5,470,218 A | 11/1995 | Hillman et al. | |
| 5,599,567 A | 2/1997 | Gellert | |
| 5,900,259 A | 5/1999 | Miyoshi et al. | |
| RE38,396 E | 1/2004 | Gellert | |
| 7,381,045 B2 | 6/2008 | Fields et al. | |
| 7,431,870 B2 | 10/2008 | Speight | |
| 8,512,625 B2 * | 8/2013 | Fields | B29C 49/063 249/79 |
| 8,562,334 B2 * | 10/2013 | Fields | B29C 49/063 249/79 |
| 2007/0141195 A1 | 6/2007 | Chen et al. | |

OTHER PUBLICATIONS

U.S. Appl. No. 12/951,882, filed Nov. 22, 2010; Title: Injection Blow Molding System With Enhanced Parison Temperature Control; Inventors: Randal L. Fields et al.

U.S. Appl. No. 12/951,901, filed Nov. 22, 2010; Title: Injection Blow Molding System With Enhanced Heat Transfer Channel Configuration; Inventors: Randal L. Fields et al.

U.S. Appl. No. 12/951,910, filed Nov. 22, 2010; Title: Injection Blow Molding System With Enhanced Parison Body Mold Configuration; Inventors: Randal L. Fields et al.

U.S. Appl. No. 12/951,934, filed Nov. 22, 2010; Title: Injection Blow Molding System With Enhanced Supply of Heat Transfer Fluid to Parison Molds; Inventors: Randal L Fields et al.

Notice of Allowance dated May 9, 2013 for co-pending U.S. Appl. No. 12/951,910; 8 pages.

Office Action dated Jan. 30, 2013 for co-pending U.S Appl. No. 12/951,882; 11 pages.

Office Action dated Jan. 29, 2013 for co-pending U.S Appl. No. 12/951,901; 12 pages.

Office Action dated Jan. 31, 2013 for co-pending U.S Appl. No. 12/951,910; 10 pages.

Office Action dated Mar. 1, 2013 for co-pending U.S Appl. No. 12/951,934; 11 pages.

* cited by examiner

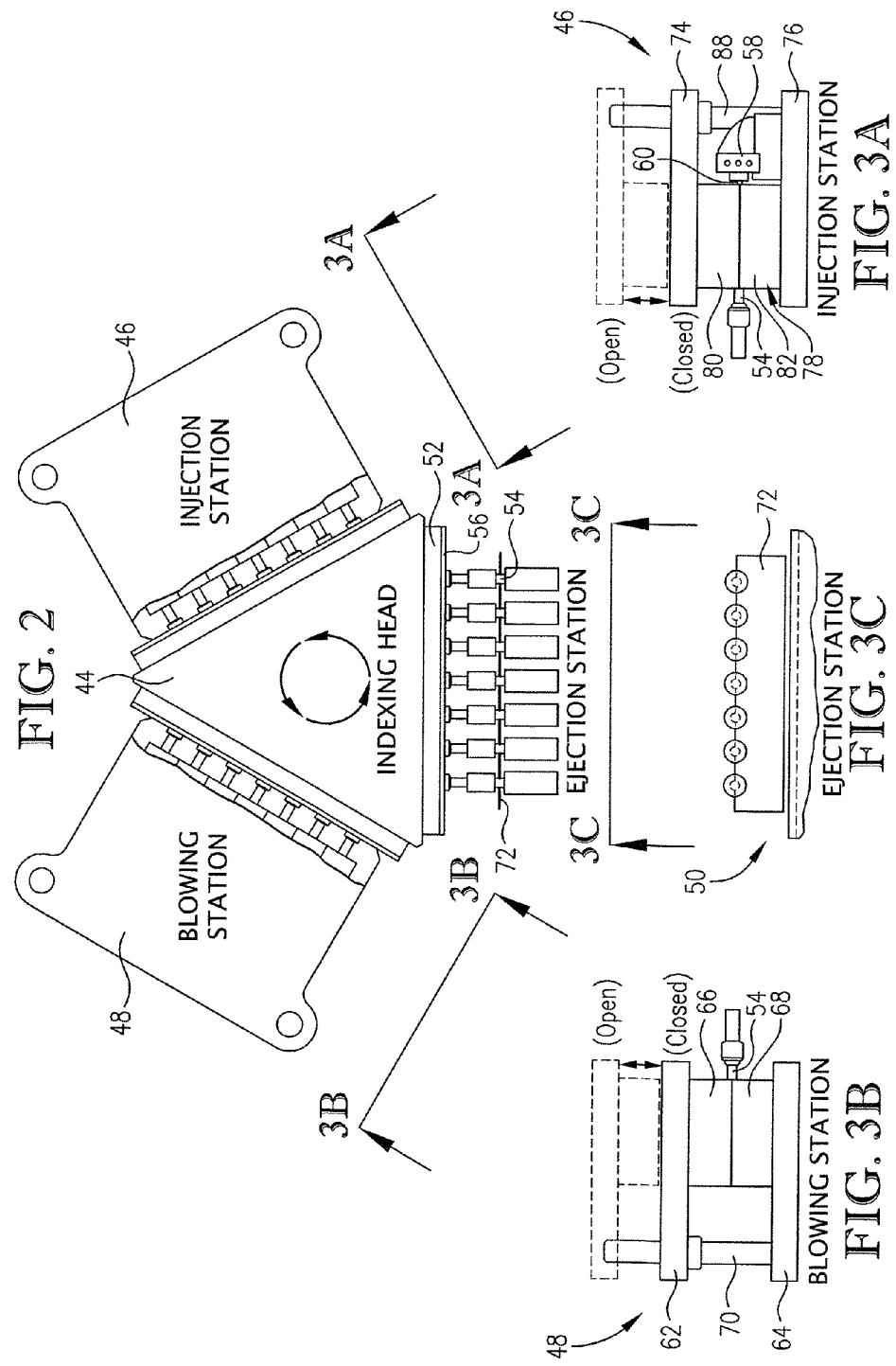

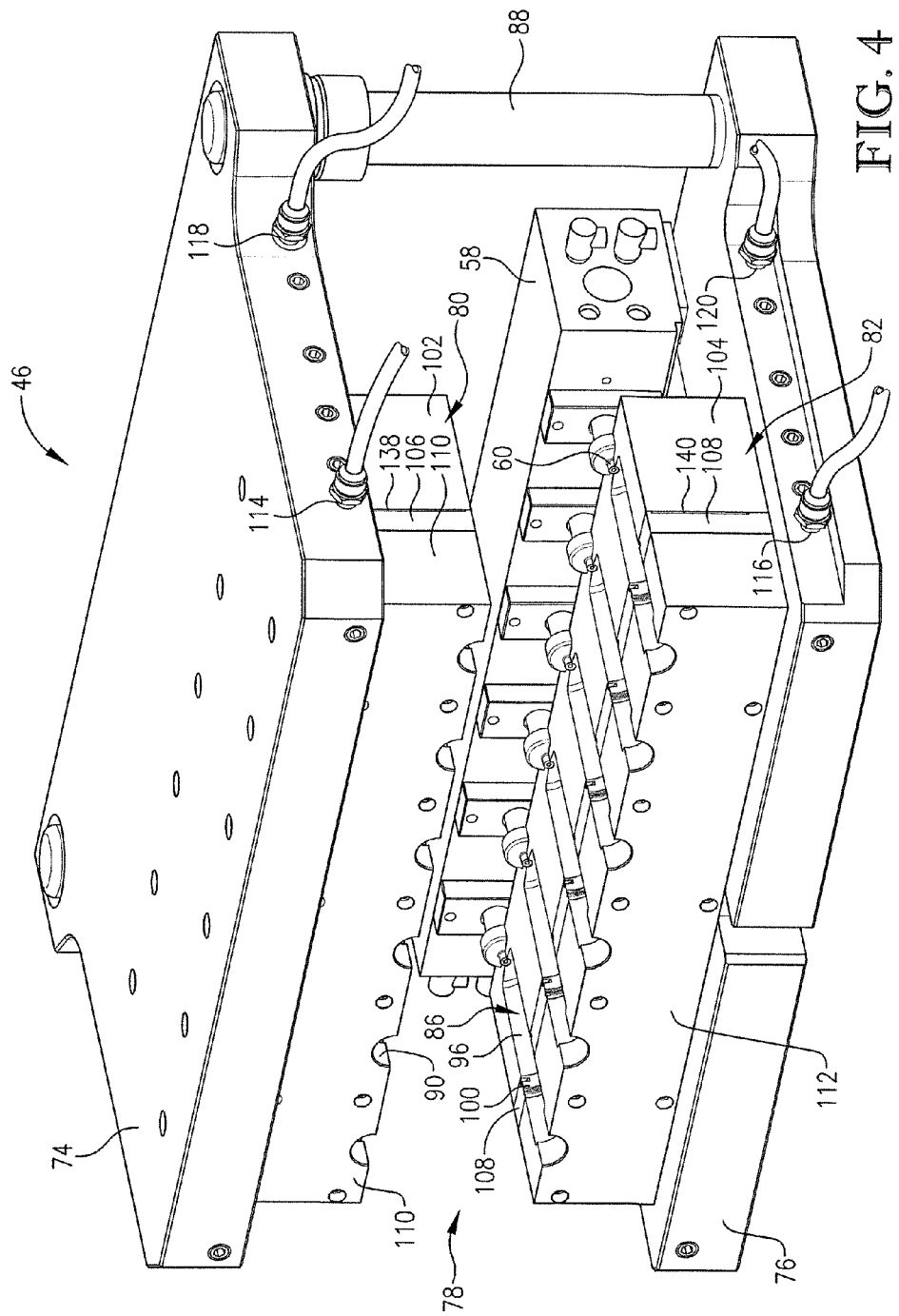

INJECTION BLOW MOLDING SYSTEM WITH ENHANCED PARISON MOLD CONFIGURATION

RELATED APPLICATIONS

This Application is a continuation of U.S. patent application Ser. No. 14/057,667, filed Oct. 18, 2013, which is a continuation-in-part of U.S. patent application Ser. No. 12/951,920, filed Nov. 22, 2010, and which claims the priority benefit of U.S. Provisional Application No. 61/749,478, filed Jan. 7, 2013. The above-listed applications in their entireties are hereby incorporated by reference into the present specification.

BACKGROUND OF THE INVENTION

1. Field of the Invention

Embodiments of the present invention relate to an injection blow molding apparatus and method for forming molded articles.

2. Description of the Related Art

Injection blow molding (IBM) is a technique used for creating various containers such as plastic bottles for medication or other contents. The IBM process is performed with an IBM machine that first injection molds a resin into a plurality of parisons of desired shapes and then blow molds the parisons into the final molded articles.

An injection station of the IBM machine typically includes a split parison mold assembly that defines a plurality of cavities within which the parisons are formed. In the injection molding stage of the IBM process, the parison-forming surfaces of the split parison mold are heated to and/or cooled to different temperatures via a plurality of water lines formed in the split parison mold near the parison-forming surfaces. The water lines may be supplied with water at different temperatures depending on the location of the water line relative to the neck or body of the parison being formed. Typically, a plurality of individual thermolators are required to control the temperature of water supplied to the various water lines in the parison mold and an operator is required to use a significant amount of discretion in making adjustments to the water temperature flowing through water lines at different locations along the body and/or neck of the parison during the injection blow molding process.

The operator discretion necessary to make certain parison mold designs function properly requires highly experienced IBM operators and can require significant trial and error in order to determine satisfactory operating parameters. Further, the complexity of manufacturing and operating split parison molds with multiple water lines formed therein can result in high capital costs, high operating costs, and high maintenance costs.

Thus, it would be desirable to have an injection molding system and/or process where IBM operator discretion is minimized, trial-and-error operation of the IBM operator is minimized, and mold tooling design, fabrication, replacement, and maintenance costs are minimized.

Additionally, individual parison molds halves are often connected to a die set via a keyway. Once the individual parison molds halves have been slid onto the keyway, they are positioned adjacent one another and connected to one another by extending an elongated horizontal member (e.g., a length of "all thread rod") through all the individual molds and compressing the individual molds halves against one another using the horizontal member.

This conventional configuration for connecting parison molds halves to the die set and to one another has several disadvantages. For example, the width of each individual mold half must be maintained within very tight tolerances to ensure proper alignment between individual top and bottom mold halves. Further, during operation, the series of side-by-side individual mold halves are subject to significant thermal expansion, which can cause misalignment of the top and bottom mold halves and can also cause misalignment with the core rods and/or injection nozzles that must mate with the molds as they close. An additional disadvantage of this conventional configuration is that replacement of a single mold half requires disconnection and reconnection of multiple mold halves.

Thus, it would be desirable to have an injection molding system and/or process where the parison molds are configured in a manner that mitigates the negative effects of thermal expansion and also permits easy attachment and detachment of a portion of the mold halves without requiring disconnection of all the mold halves.

SUMMARY OF THE INVENTION

In certain embodiments of the present inventions there is provided a split parison mold assembly configured for connection to upper and lower die sets of an injection blow molding system. The split parison mold assembly comprises a plurality of pairs of upper and lower multi-cavity parison mold half blocks. Each pair of the mold half blocks is configured to cooperatively define a plurality of parison forming cavities. At least two adjacent lower multi-cavity mold half blocks are spaced apart from one another and at least two adjacent upper multi-cavity mold half blocks are spaced apart from one another.

In certain embodiments of the present invention there is provided a split parison mold assembly configured for connection to upper and lower die sets of an injection blow molding system. The split parison mold assembly comprises a plurality of pairs of upper and lower multi-cavity parison mold half blocks. Each pair of the mold half blocks are configured to cooperatively define a plurality of parison forming cavities. At least two of the lower multi-cavity mold half blocks are configured for independent connection to the lower die set by one or more vertically extending lower fasteners. At least two of the upper multi-cavity mold half blocks are configured for independent connection to the upper die set by one or more vertically extending upper fasteners.

In certain embodiments of the present invention there is provided an injection blow molding system for injection molding a resin into a plurality of parisons and blow molding the parisons into a plurality of molded articles. The injection blow molding system comprises an injection station for injection molding the resin into the parisons, a blowing station for blow molding the parisons into the molded articles, and an indexing head for transferring the parisons from the injection station to the blowing station. The injection station comprises upper and lower die sets shiftable between an open position and a closed position. The injection station further comprises a plurality of upper multi-cavity parison mold half blocks coupled to the upper die set and spaced apart from one another. The injection station further comprises a plurality of lower multi-cavity parison mold half blocks coupled to the lower die set and spaced apart from one another. Each of the upper multi-cavity parison mold half blocks has a corresponding lower multi-cavity parison mold half block. Each pair of corresponding upper and lower mold half blocks cooperatively defines the exterior shape of the bodies of at least two of the parisons.

In certain embodiments of the present invention there is provided an injection blow molding system for injection molding a resin into a plurality of parisons and blow molding the parisons into a plurality of molded articles. The injection blow molding system comprises an injection station for injection molding the resin into the parisons, a blowing station for blow molding the parisons into the molded articles, and an indexing head for transferring the parisons from the injection station to the blowing station. The injection station comprises upper and lower die sets shiftable between an open position and a closed position. The injection station further comprises a plurality of upper multi-cavity parison mold half blocks independently coupled to the upper die set. The injection station further comprises a plurality of lower multi-cavity parison mold half blocks independently coupled to the lower die set. Each of the upper multi-cavity parison mold half blocks has a corresponding of lower multi-cavity parison mold half block. Each pair of corresponding upper and lower mold halve blocks cooperatively defines the exterior shape of the bodies of at least two of the parisons.

In certain embodiments of the present invention there is provided an injection blow molding process comprising: (a) injection molding a resin into a plurality of parisons at an injection station, wherein the injection molding includes (i) shifting upper and lower die sets of the injection molding station from an open position to a closed position, (ii) injecting the resin into a plurality of parison cavities cooperatively defined by upper and lower mold half assemblies coupled to the upper and lower die sets respectively, wherein the upper mold half assembly comprises a plurality of upper mold half blocks independently coupled to the upper die, wherein the lower mold half assembly comprises a plurality of lower mold half blocks independently coupled to the lower die set, wherein each of the upper mold half blocks has a corresponding lower mold half block for cooperatively defining the exterior shape of the bodies of at least two one of the parisons; (b) transferring the parisons from the injection station to a blowing station; and (c) blow molding the parisons into molded articles at the blowing station.

Embodiments of the present invention are described in detail below with reference to the attached drawing figures, wherein:

FIG. 2 is a plan view of an injection blow molding apparatus, particularly illustrating the apparatus's injection station, blowing station, ejection station, and indexing head;

FIG. 3A is a side view of the injection station depicted in FIG. 1, particularly illustrating the injection mold die sets, split injection mold assembly, and resin manifold assembly;

FIG. 3B is a side view of the blowing station depicted in FIG. 1, particularly illustrating the blow mold die sets and split blow mold assembly;

FIG. 3C is a schematic side view of the ejection station depicted in FIG. 1, particularly illustrating the stripper plate used to remove blow molded articles from the core rods of the indexing head;

FIG. 4 is an isometric view of an injection station configured in accordance with a first embodiment of the present invention, particularly illustrating the injection station in an open position with two die sets attached to a split parison mold assembly comprising monolithic neck mold halves and monolithic body mold halves forming a plurality of parison cavities;

Figure 20:
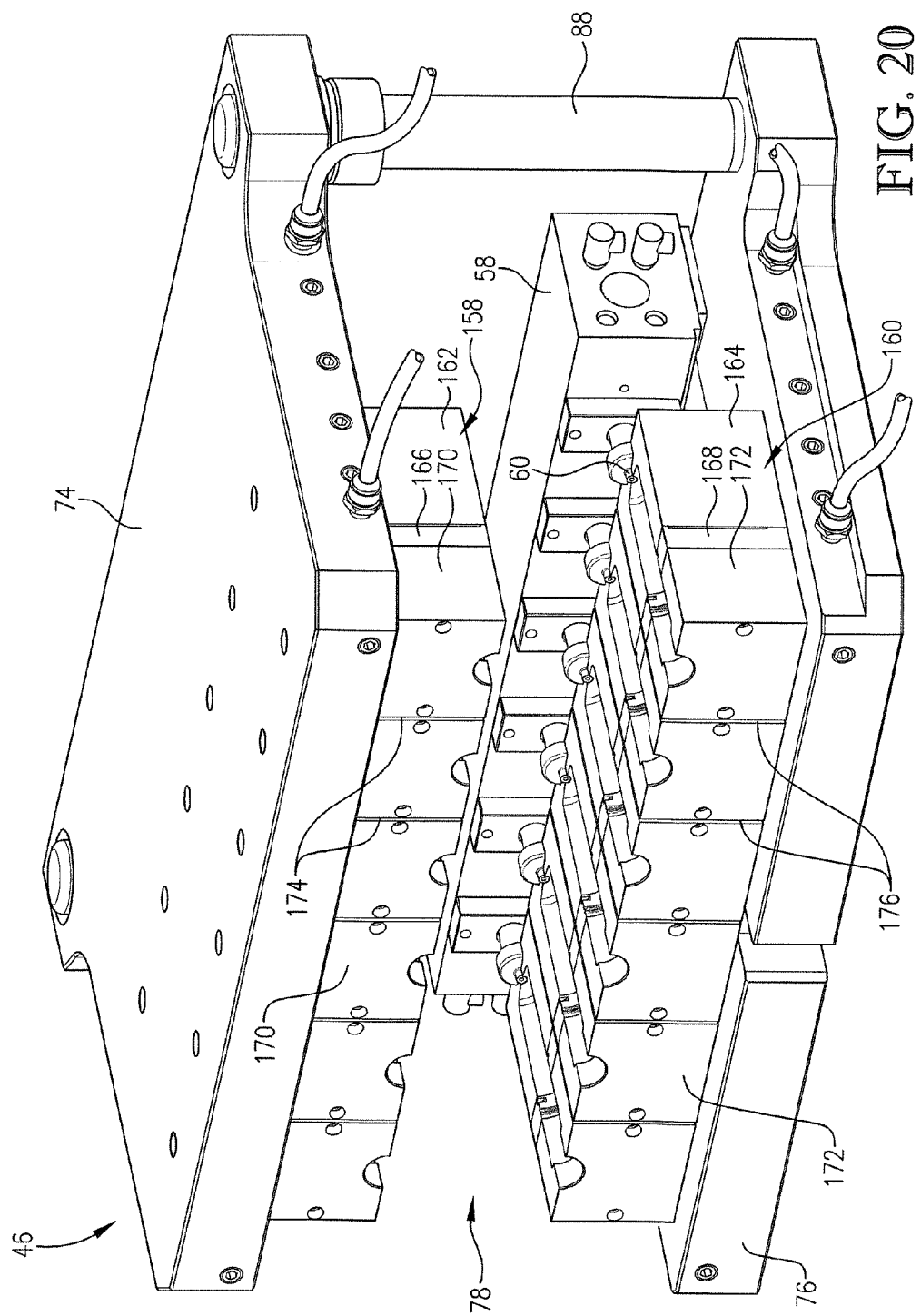
Figure 21:
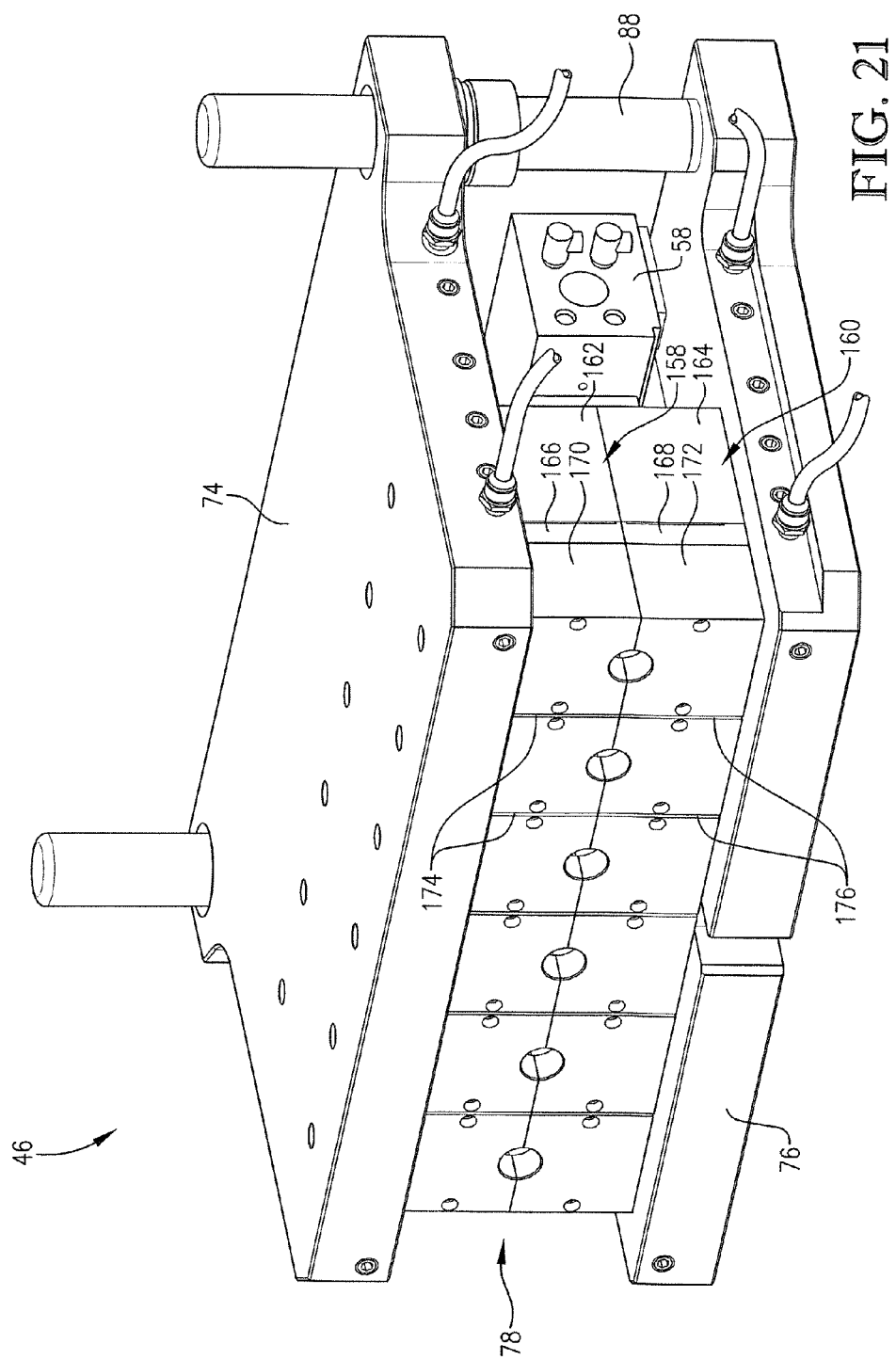
Figure 22:
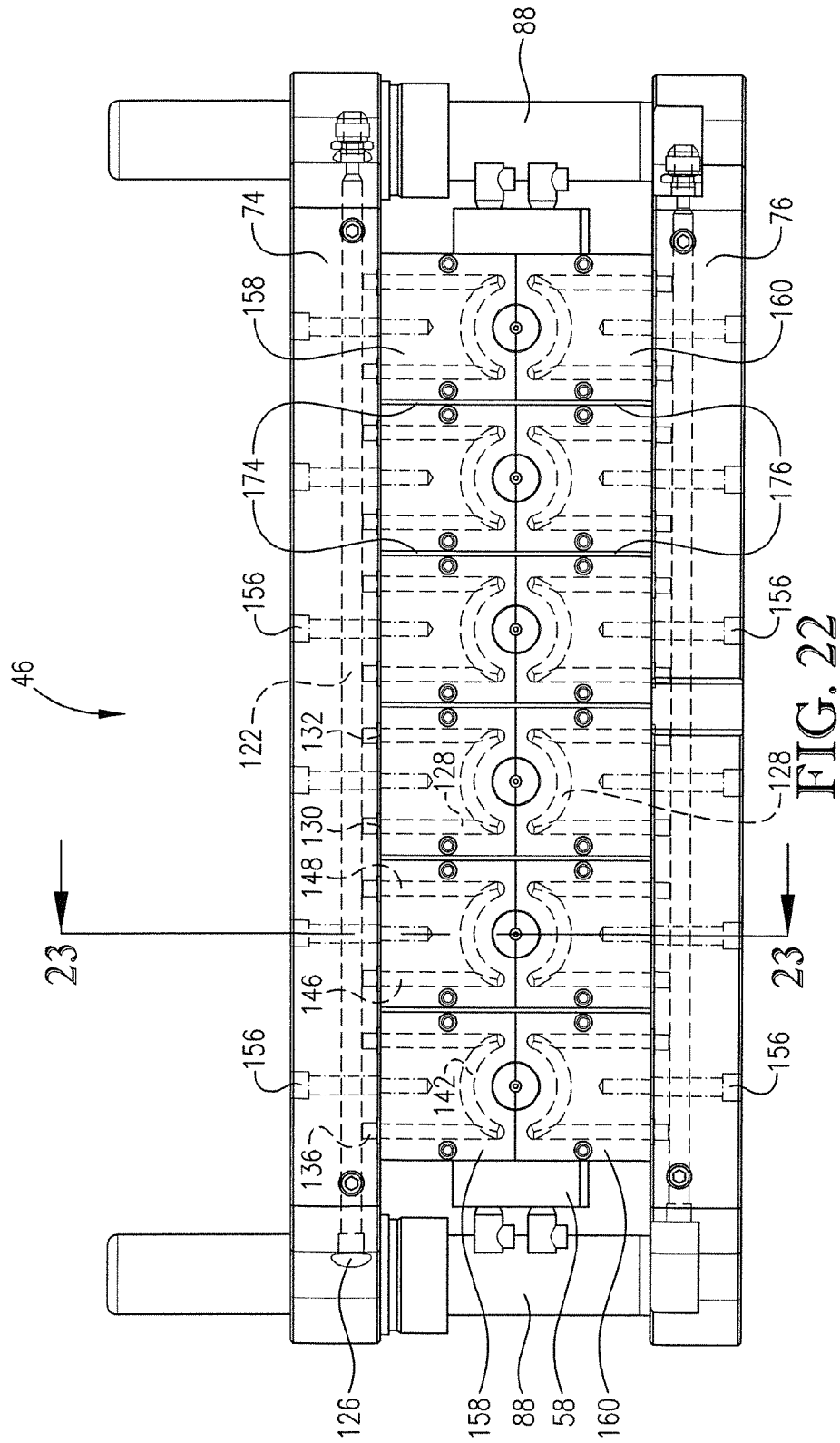
Figure 23:
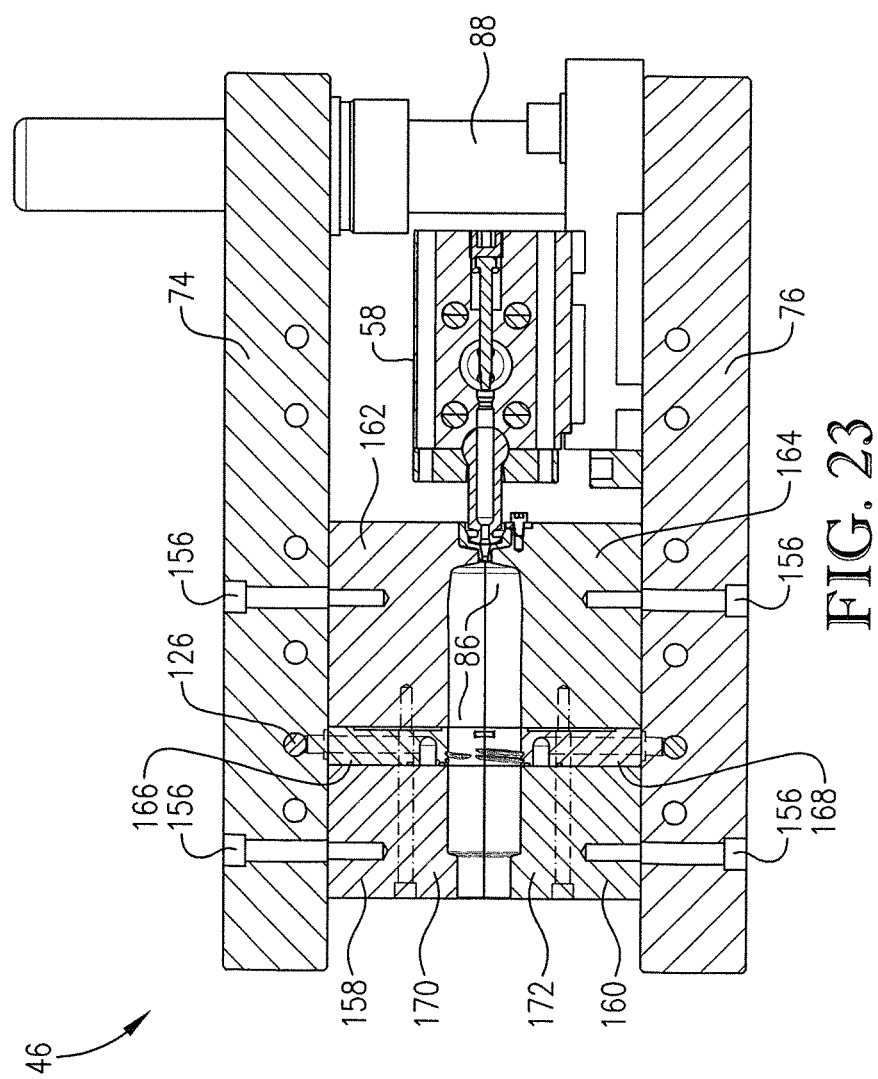
Figure 24:
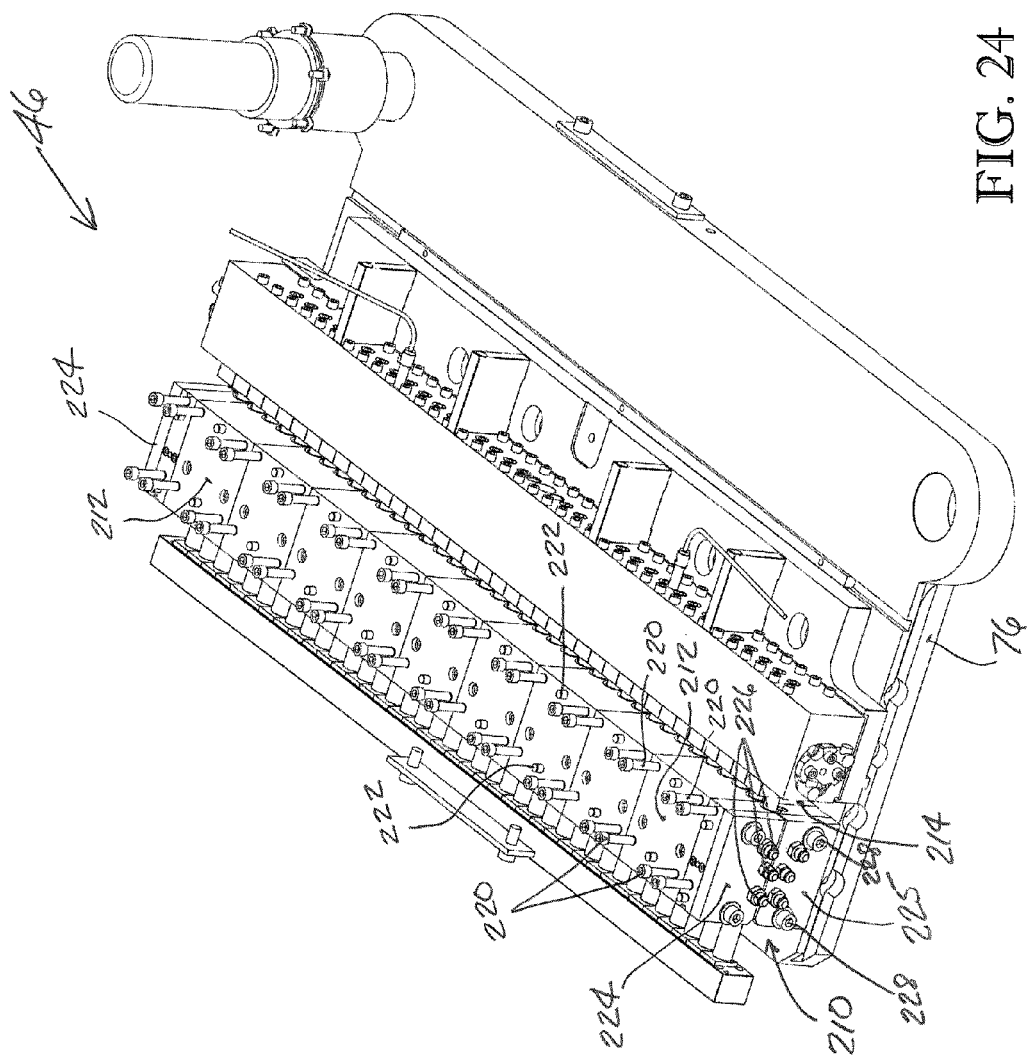
Figure 25:
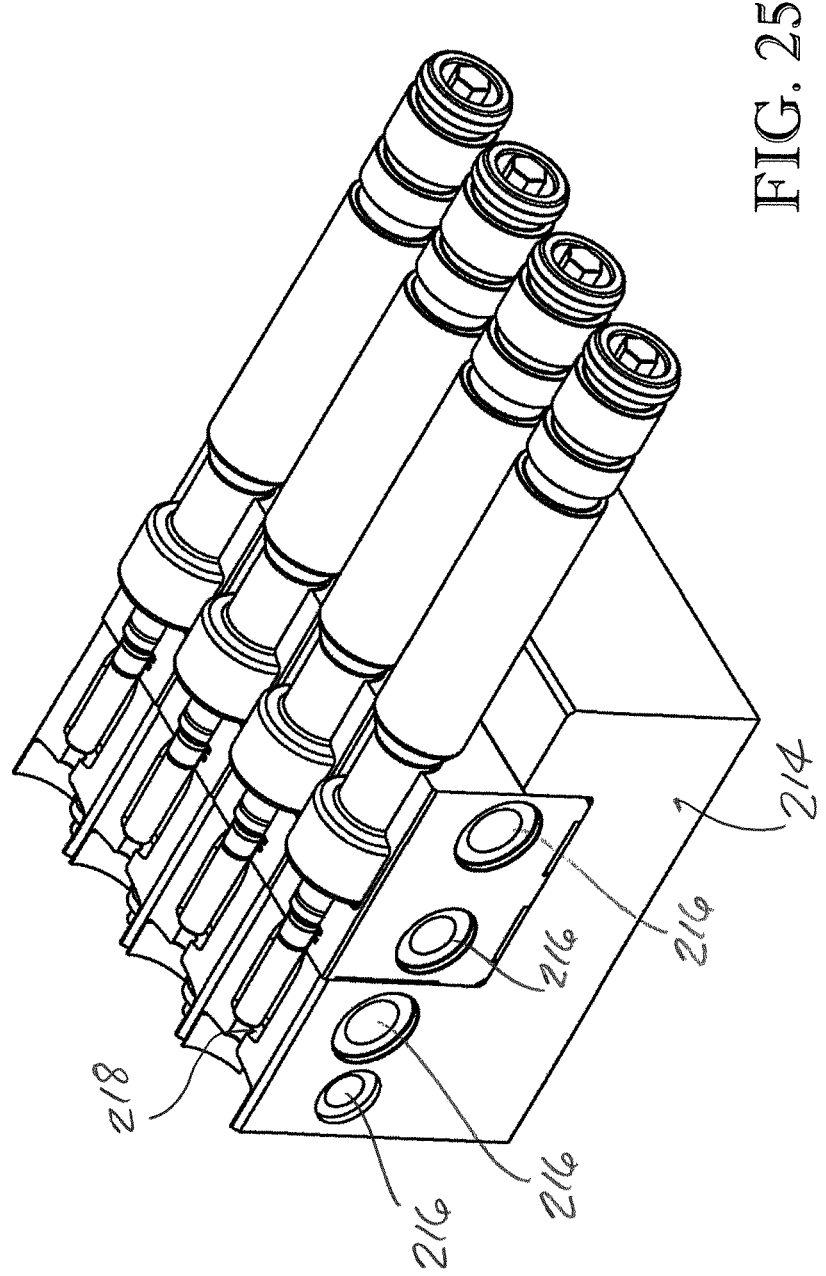
Figure 26:
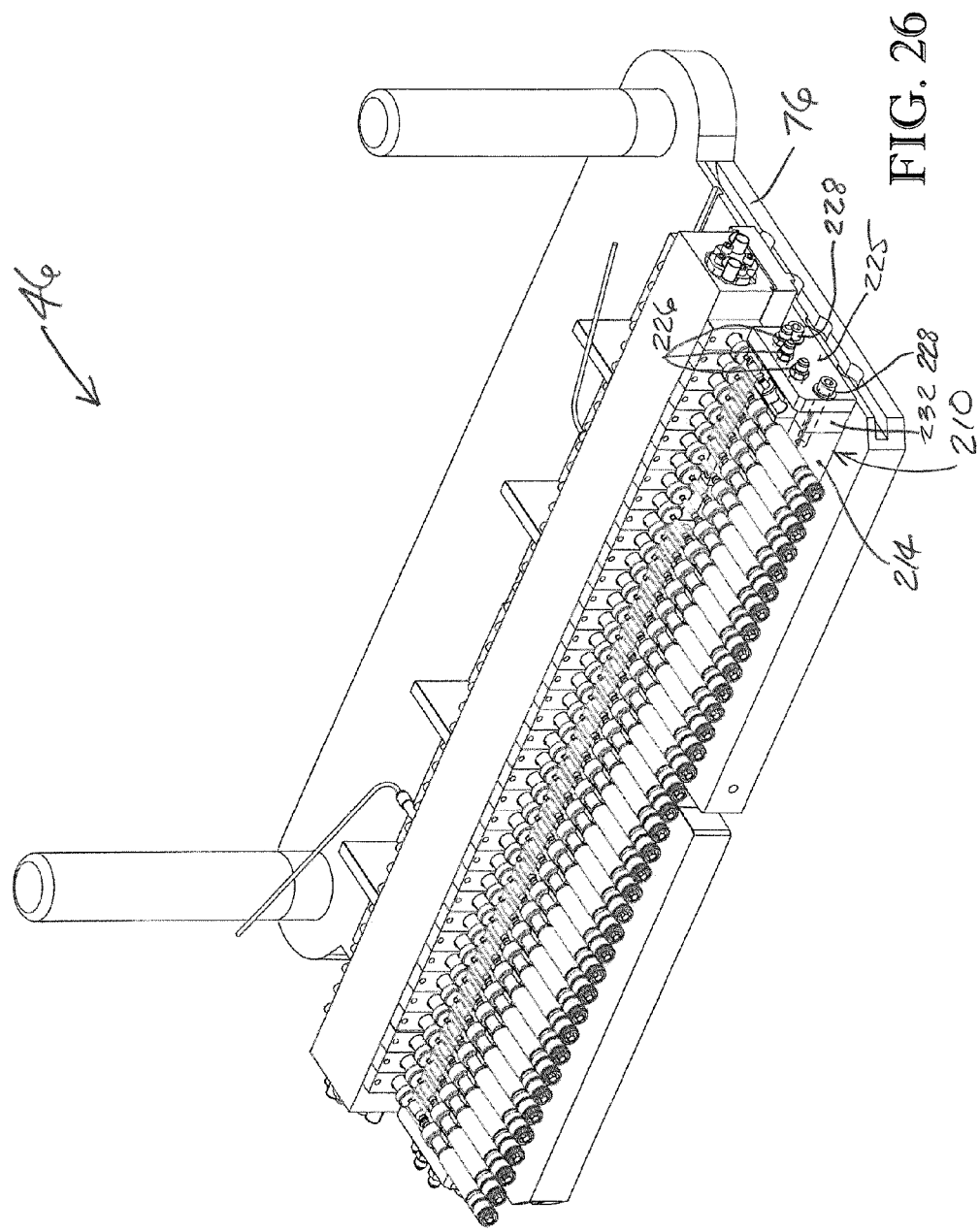
Figure 27:
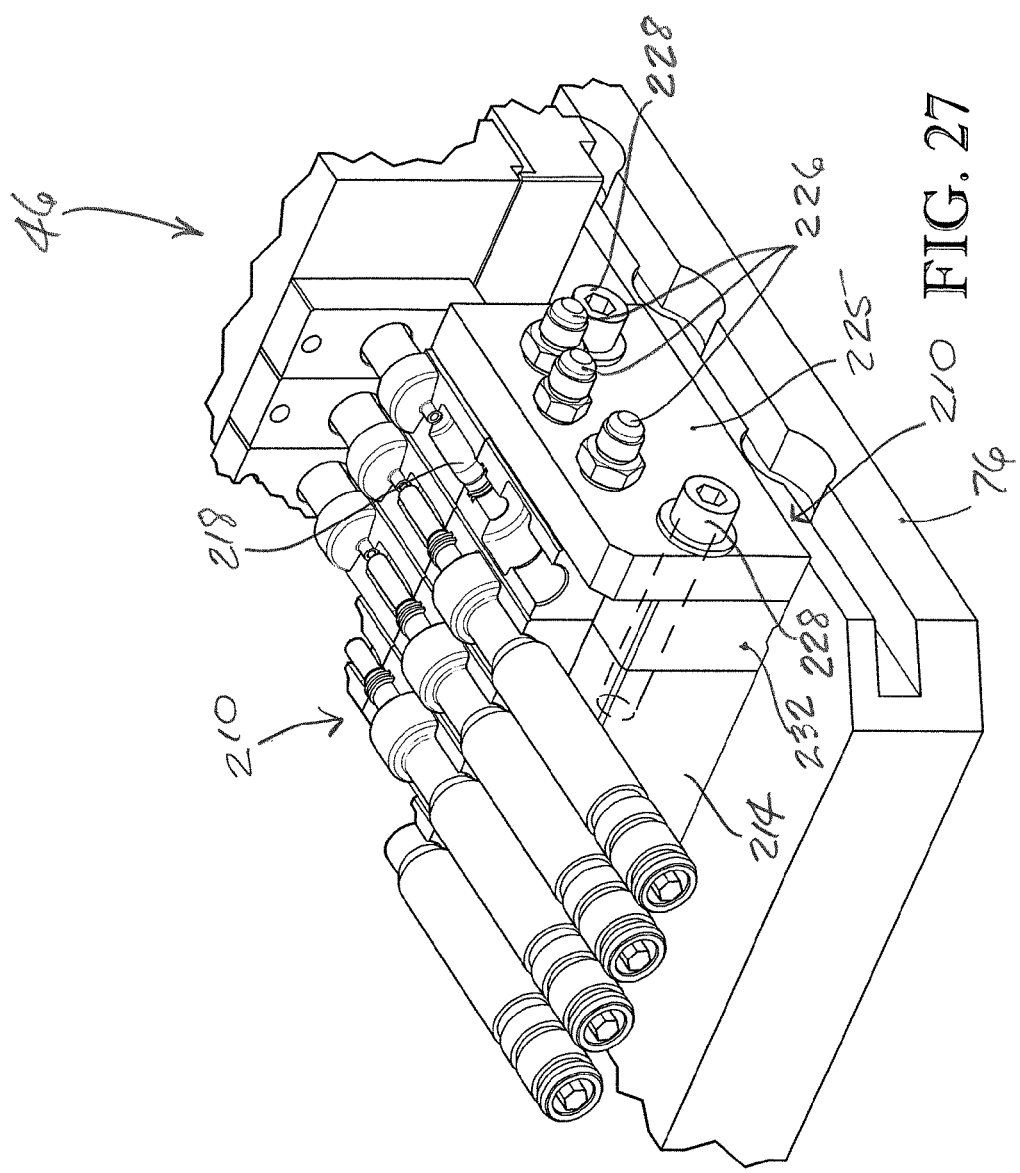
Figure 28:
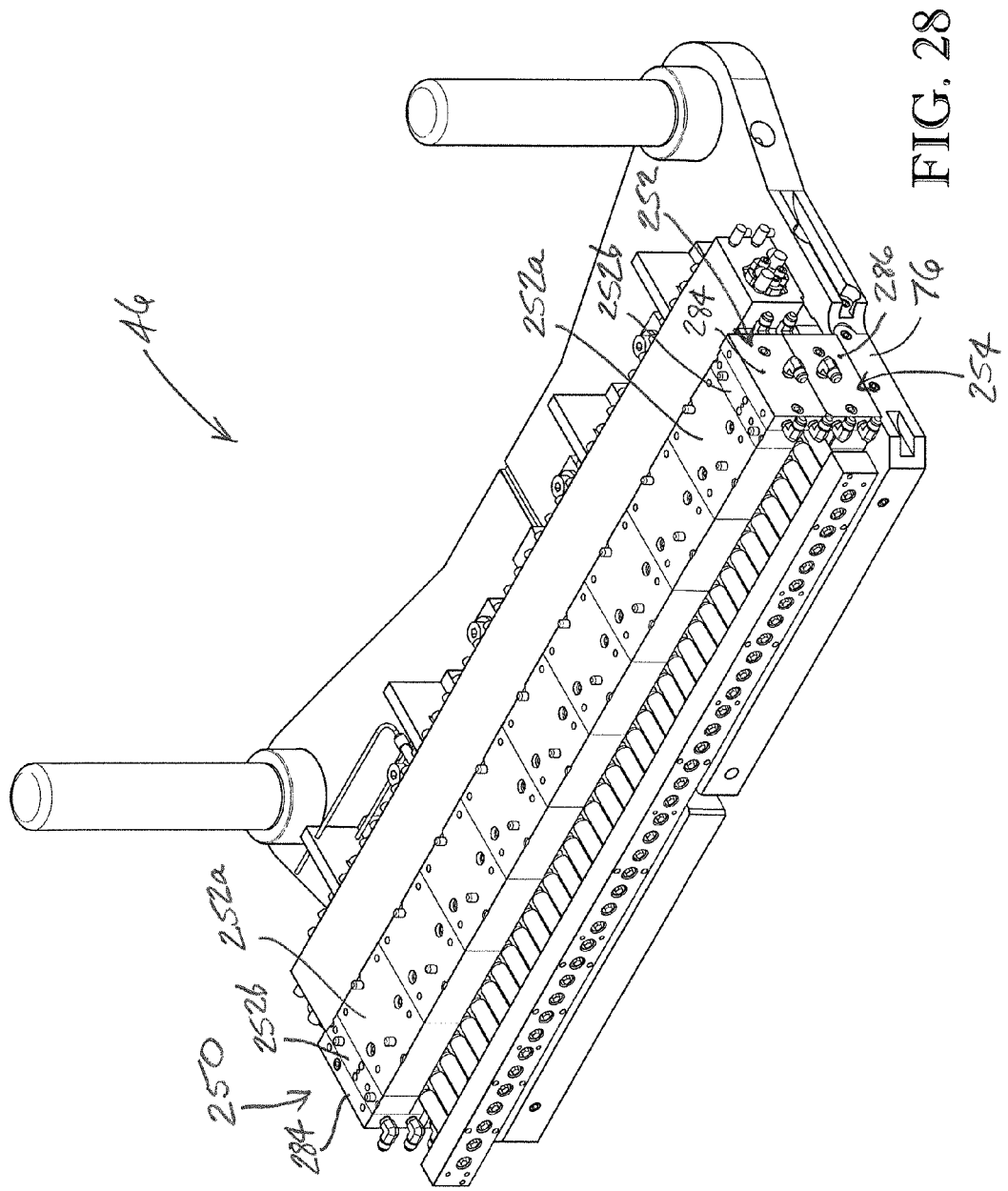
Figure 29:
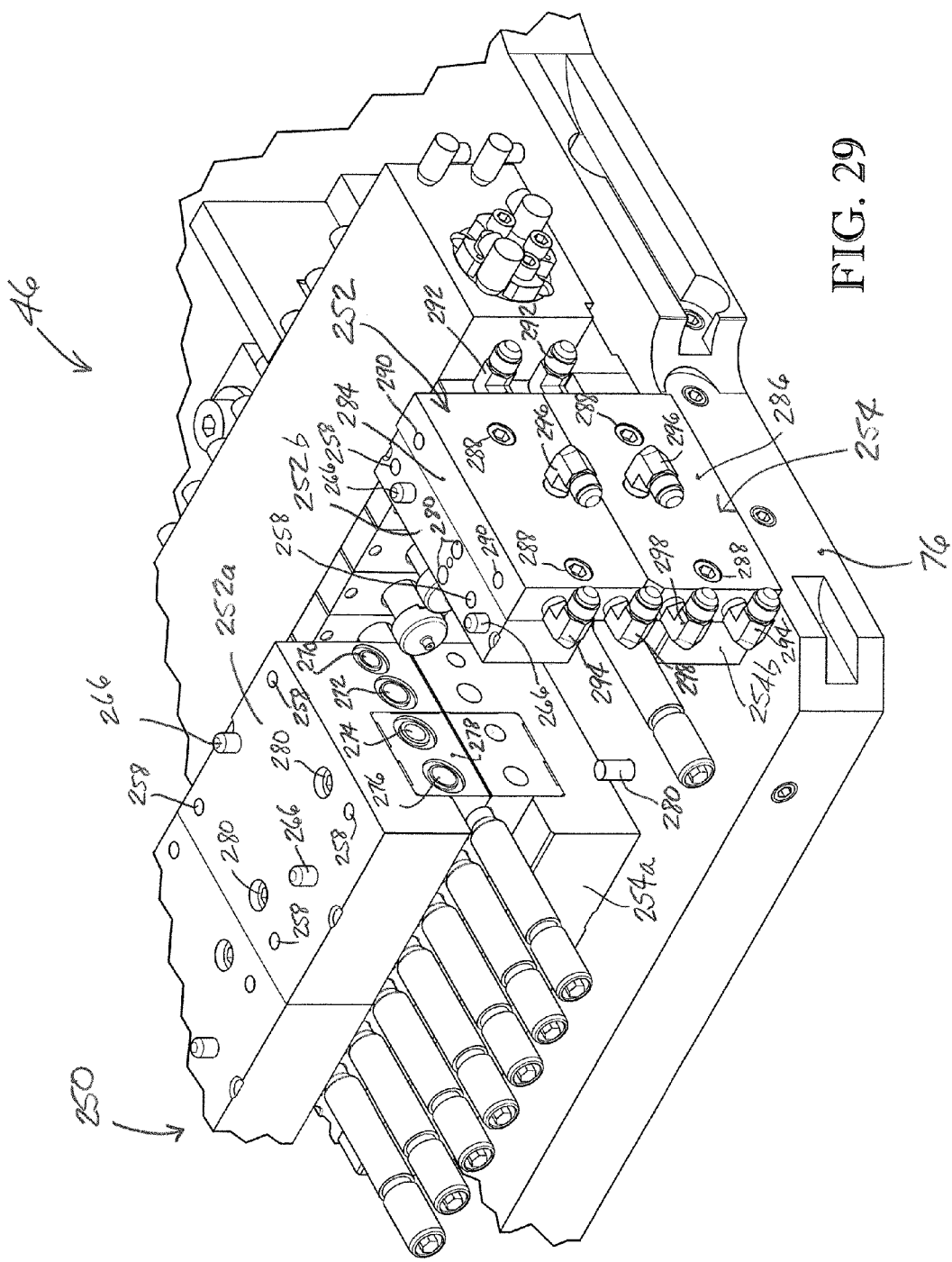
Figure 30:
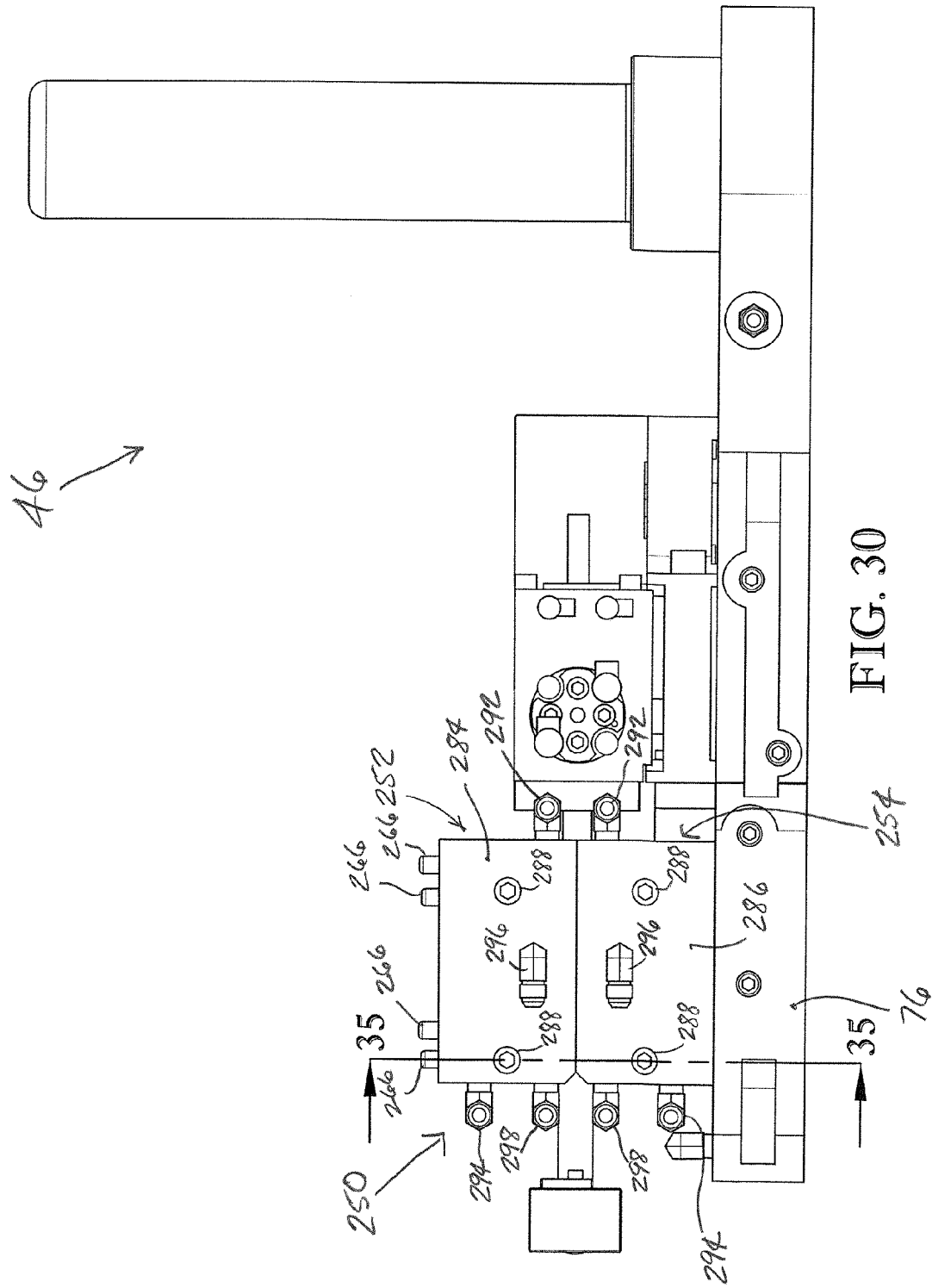
Figure 31:
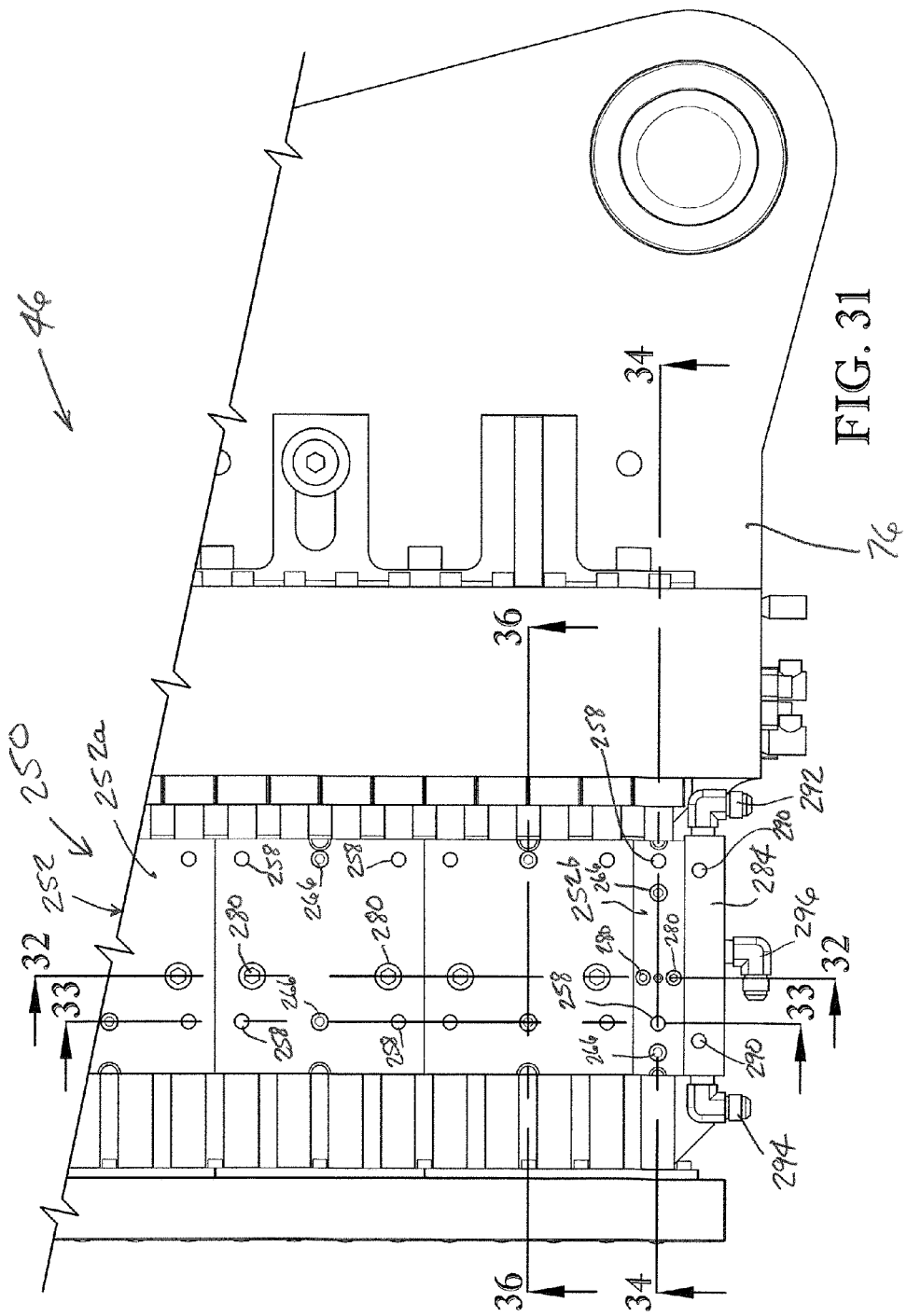
Figure 32:
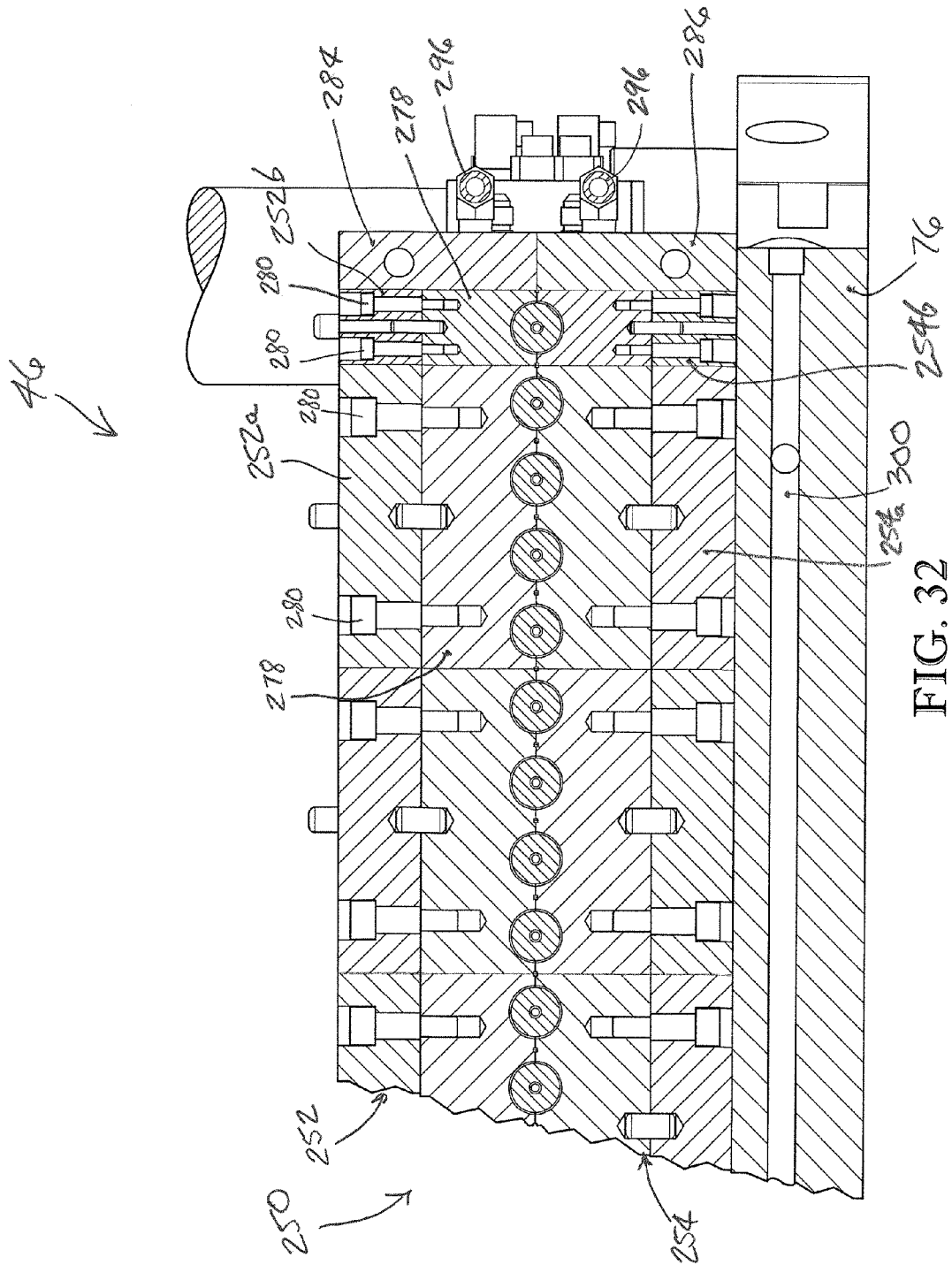
Figure 33:
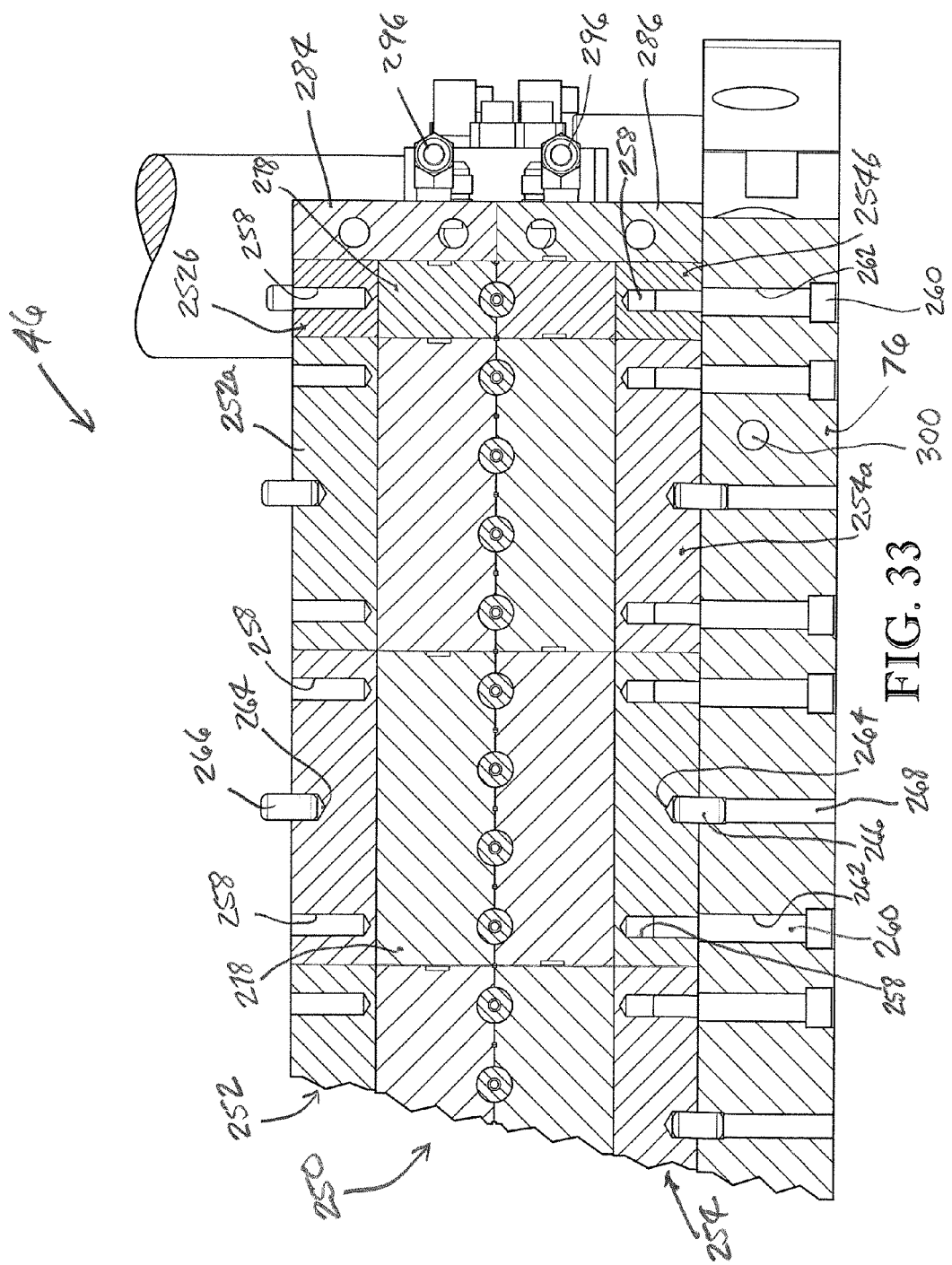
Figure 34:
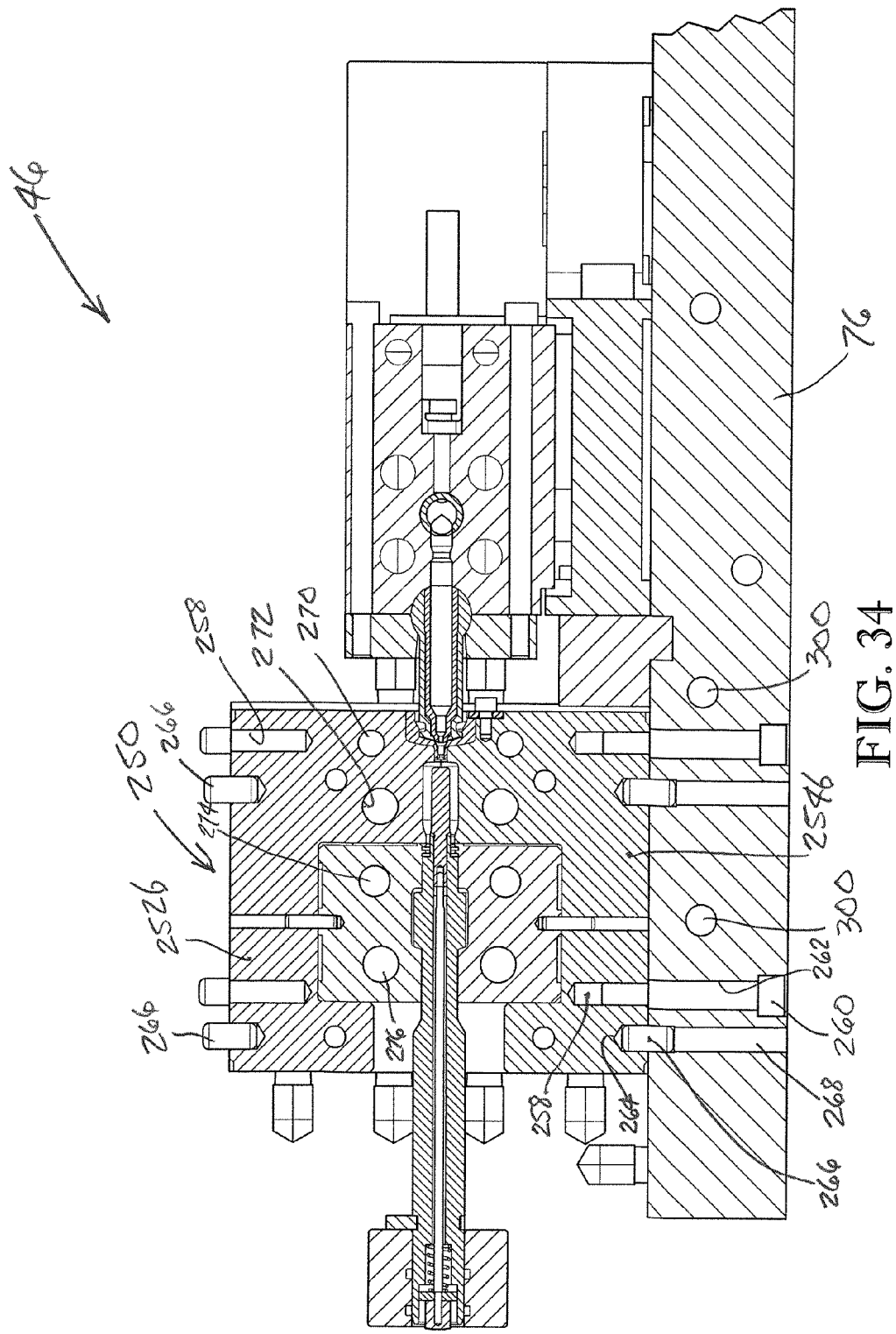
Figure 35:
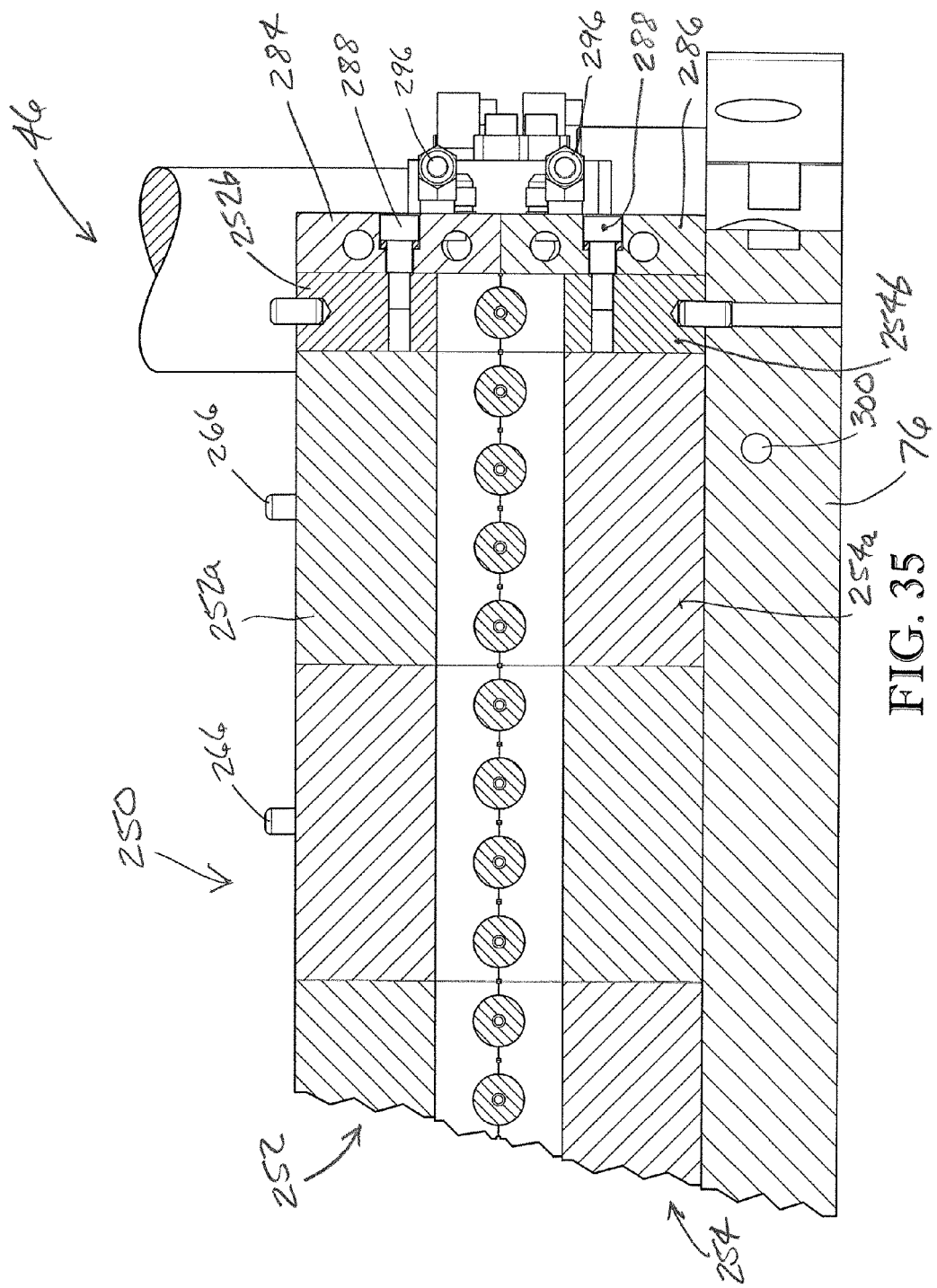
Figure 36:
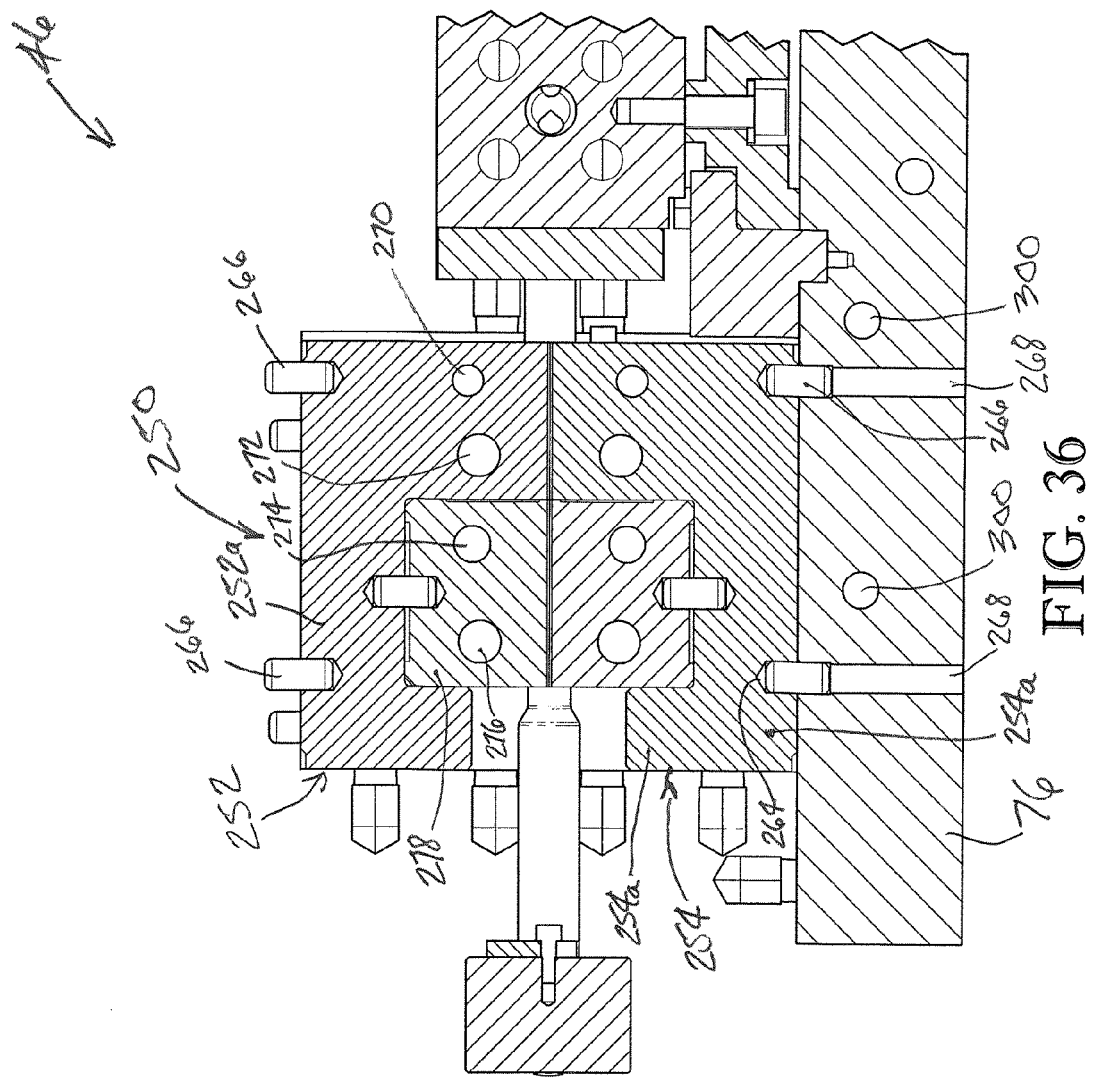
Figure 37:
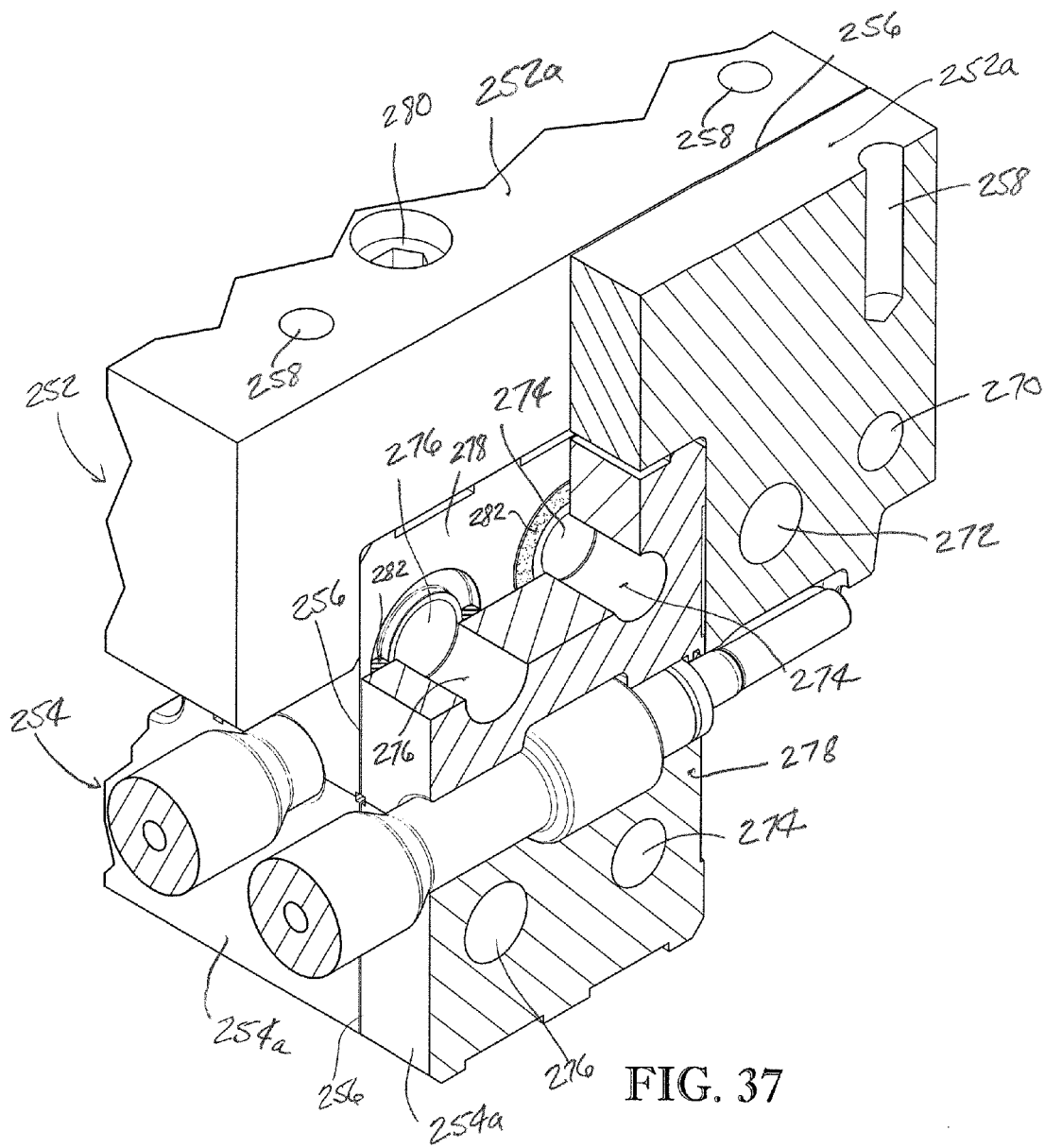

FIG. 20 is an isometric view of an injection station configured in accordance with a second embodiment of the present invention, particularly illustrating the injection station in an open position with two die sets attached to a plurality of first or second individual mold halves, each individual mold half comprising an individual neck mold half and an individual body mold half forming one of the parison cavities;

FIG. 21 is an isometric view of the injection station of FIG. 20 in a closed position;

FIG. 22 is a front view of the injection station of FIG. 21, particularly illustrating mechanical fasteners independently attaching each of the individual mold halves to the first or second die set;

FIG. 23 is a cross-sectional side view of the injection station of FIG. 21, particularly illustrating individual body mold halves and individual interlock inserts independently attached to the first or second die set;

FIG. 24 is a partial isometric view of an injection station configured in accordance with a third embodiment of the present invention, particularly illustrating the injection station with a split parison mold assembly comprising a plurality of multi-cavity split mold blocks, each defining a plurality of parison cavities;

FIG. 25 is an enlarged isometric view of a lower half of one of the multi-cavity split mold blocks depicted in FIG. 24, particularly illustrating the heat transfer channels extending through the mold block adjacent the parison-forming surfaces;

FIG. 26 is a partial isometric view of the injection station of FIG. 24, with the upper halves of the split mold blocks being removed;

FIG. 27 is an enlarged, fragmentary isometric view of a lower portion of the mold assembly and lower die set particularly illustrating the configuration of the parison forming surface and the manner in which horizontally-extending fasteners couple an end plate, a single-cavity mold half, and an outer multi-cavity mold half block to one another;

FIG. 28 is a partial isometric view of the injection station constructed in accordance with a fourth embodiment of the invention;

FIG. 29 is an enlarged, fragmentary isometric view of the injection station of FIG. 28 with an endmost pair of multi-cavity mold halves removed to reveal details of construction;

FIG. 30 is an end elevational view of the partial injection station of FIG. 28;

FIG. 31 is a fragmentary, top plan view of the partial injection station of FIG. 28;

FIG. 32 is a fragmentary cross-sectional view of the partial injection station of FIG. 28 taken substantially along line 32-32 of FIG. 31;

FIG. 33 is a fragmentary cross-sectional view of the partial injection station of FIG. 28 taken substantially along line 33-33 of FIG. 31;

FIG. 34 is a fragmentary cross-sectional view of the partial injection station of FIG. 28 taken substantially along line 34-34 of FIG. 31;

FIG. 35 is a fragmentary cross-sectional view of the partial injection station of FIG. 28 taken substantially along line 35-35 of FIG. 30;

FIG. 36 is a fragmentary cross-sectional view of the partial injection station of FIG. 28 taken substantially along line 36-36 of FIG. 31; and FIG. 37 is an enlarged, fragmentary isometric view, partially in cross-section and with parts broken away, of the parison mold assembly illustrating internal details of construction.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
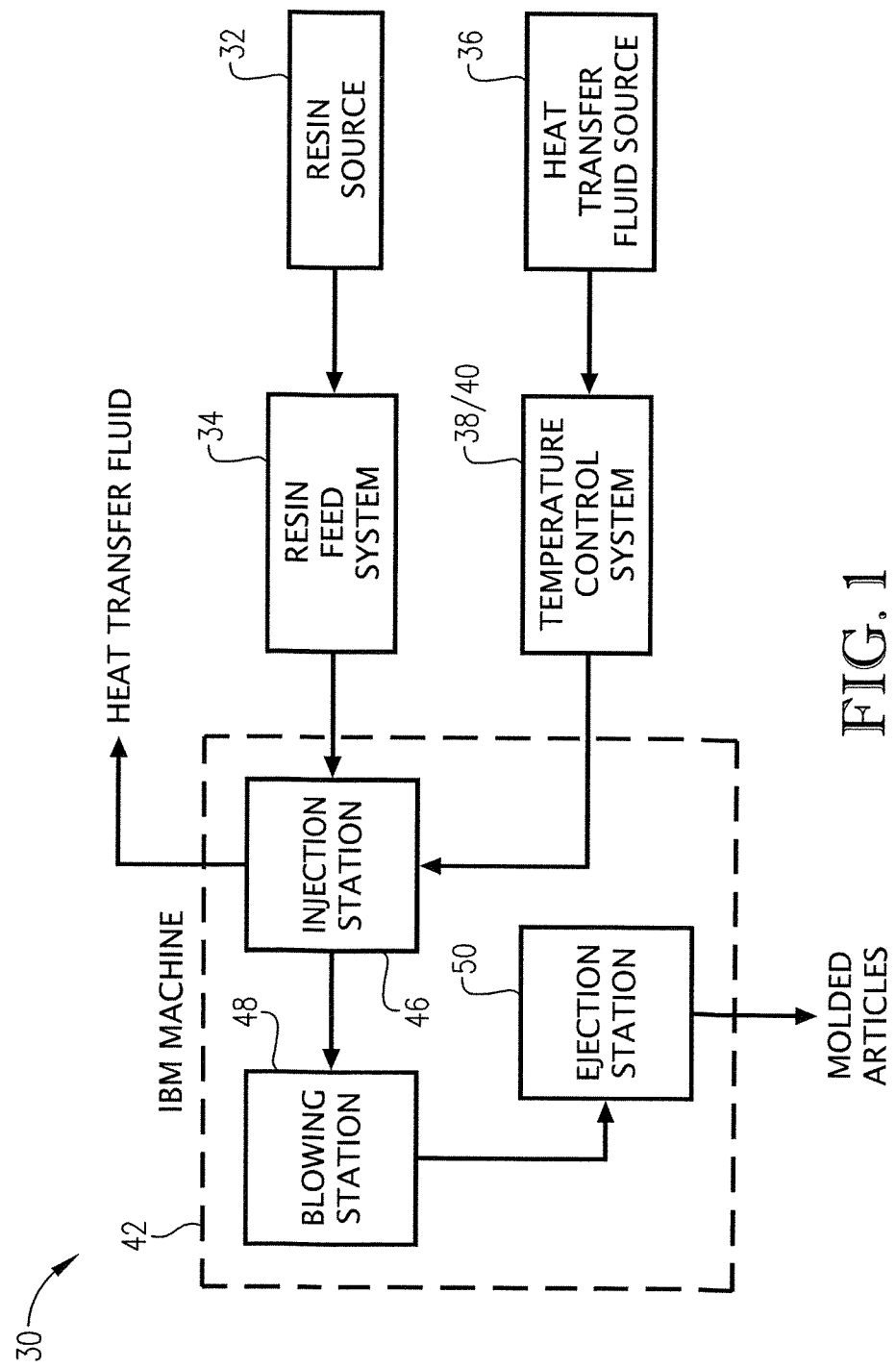
FIG. 1 is a block diagram of a system for producing blow molded articles, particularly illustrating an injection blow molding apparatus and systems for supplying resin and heat transfer fluid to an injection station of the injection blow molding apparatus.
Figure 5:
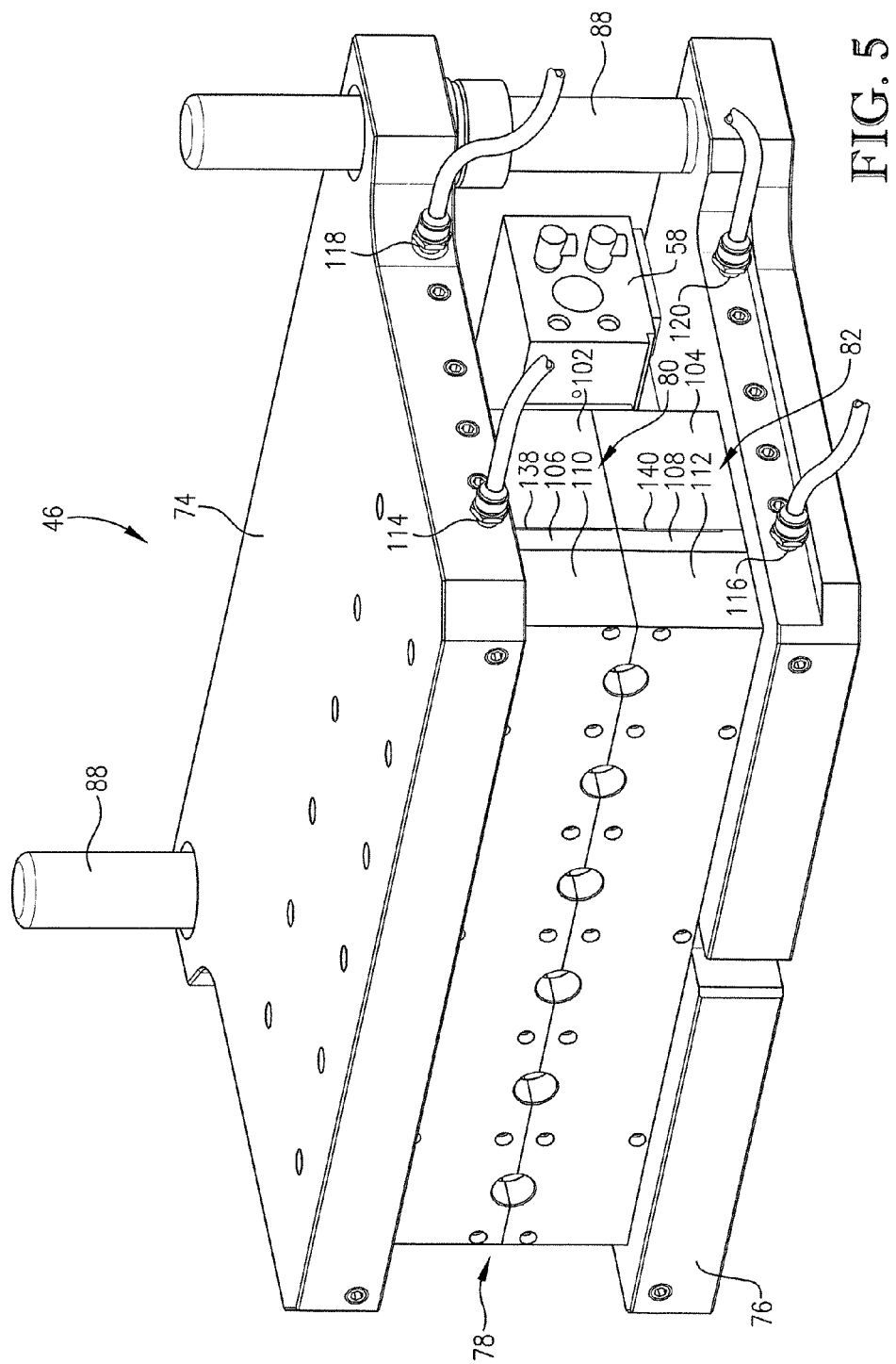
FIG. 5 is an isometric view of the injection station of FIG. 4 in a closed position.
Figure 6:
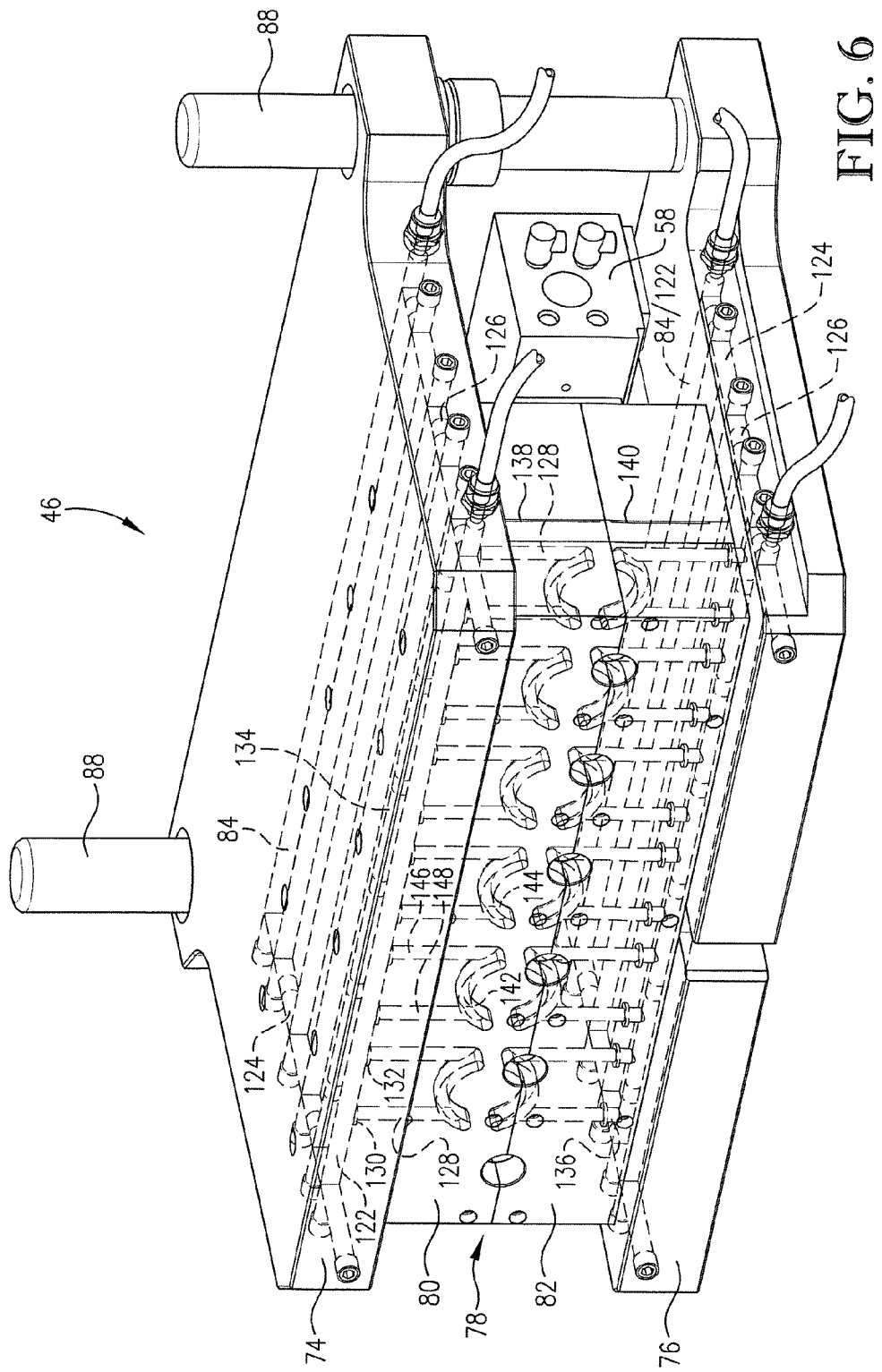
FIG. 6 is an isometric view of the injection station of FIG. 5 illustrating a plurality of heat transfer channels in phantom located within the die sets and the split parison mold assembly.
Figure 7:
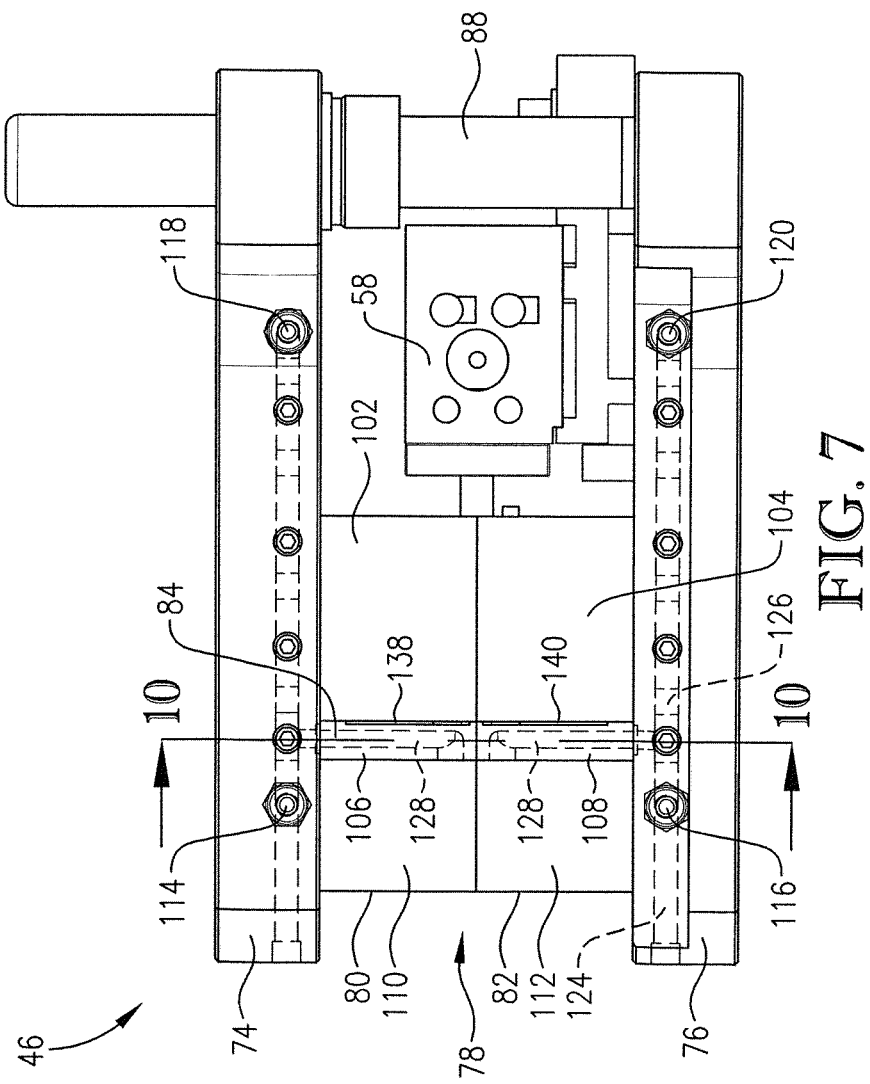
FIG. 7 is a side view of the injection station depicted in FIG. 5, particularly illustrating the interaction between the heat transfer channels in the die sets and the heat transfer channels in the neck mold halves and also showing an absence of heat transfer channels in the body mold halves.

An injection blow molding system 30, as illustrated in FIGS. 1-23, is configured for injection molding a resin into a plurality of parisons and blow molding the parisons into a plurality of molded articles. As illustrated in FIG. 1, the injection blow molding system 30 may comprise: a resin source 32, a resin feed system 34, a heat transfer fluid source 36, a temperature control system 38 comprising at least one temperature control unit 40, and an injection blow molding (IBM) machine 42.

The resin source 32 may be any apparatus for producing and/or storing resin suitable for being molded and hardened into one or more molded articles. For example, the resin provided at the resin source 32 may be polyolefin resin. The resin feed system 34 may be coupled in fluid-flow communication with the resin source 32 and configured to inject resin into cavities of a mold of the IBM machine 42, as described below.

The heat transfer fluid source 36 may be any system capable of providing an amount of heat transfer fluid sufficient to supply the heat transfer fluid to desired portions of the IBM machine 42 in a desired quantity and for a desired length of time during an injection molding process. For example, the heat transfer fluid source 36 may be a water supply or a supply of any fluid of a sufficient viscosity to freely flow throughout desired portions of the IBM machine 42. The heat transfer fluid may also have sufficient thermal characteristics to remain within a desired temperature range as it flows through the desired portions of the IBM machine 42, as described in detail below.

The temperature control system 38 may comprise one or more of the temperature control units 40 (e.g., thermolators) coupled in fluid-flow communication with the heat transfer fluid source 36 and operable to control the temperature of the heat transfer fluid within a predetermined temperature range. In some embodiments, a plurality of the temperature control systems 38 and/or a plurality of the temperature control units 40 may be provided. However, in some embodiments, only one temperature control unit 40 is used to control the temperature of heat transfer fluid injected into the IBM machine 42. The temperature control unit 40 may provide heat transfer fluid of a substantially uniform temperature to the desired portions of the IBM machine 42, as described in detail below.

As illustrated in FIG. 2, the IBM machine 42 may be configured for injection blow molding a plurality of parisons and/or molded articles. The IBM machine 42 may comprise an indexing head 44, an injection station 46, a blowing station 48, and an ejection station 50. The injection blow molding process performed with the IBM machine 42 may include inserting polyolefin resin at the injection station 46 to form the parisons while simultaneously passing a heat transfer fluid through heat transfer channels defined within the injection station 46 to regulate the temperature of the injection station 46, as described below. The injection blow molding process may then include actuating the indexing head 44 to transfer the resulting parisons from the injection station 46 to the blowing station 48 to be blow molded into molded articles. Next, the molded articles may be transferred via the indexing head 44 to the ejection station 50, where the parisons are then ejected from the IBM machine 42. The injection blow molding process described herein may be performed repetitively by the IBM machine 42. For example, the method steps described herein may be repeated at least 100, 1,000, or 10,000 consecutive times.

The indexing head 44 is configured for transferring the parisons from the injection station 46 to the blowing station 48 and then to the ejection station 50. The indexing head 44 may comprise a face block 52 on one or more outward-facing sides thereof, one or more core rod retainer plates 56 attached to the face blocks 52, and one or more core rods 54 attached to the core rod retainer plates 56. Each of the core rods 54 may be spaced a distance apart from adjacent core rods 54 and may be shaped according to a desired interior shape of the parisons to be formed thereon. In one embodiment of the IBM machine 42, the indexing head 44 may be configured to rotate the core rods 54 from the injection station 46 to the blowing station 48 and then to the ejection station 50 as directed by an operator or automated control devices (not shown). For example, the face blocks 52 may be arranged in a substantially triangular configuration with core rods 54 protruding from one or more sides of the triangular configuration, and the indexing head 44 may rotate approximately 120 degrees to move the core rods 54 on one side of the triangular configuration from the injection station 46 to the blowing station 48. In some embodiments of the injection blow molding system 30, the indexing head 44 may have core rods 54 protruding from each side, such that the injection station 46, blowing station 48, and ejection station 50 may each operate simultaneously on a different set of parisons or molded articles.

The injection station 46 may be configured for injection molding the resin into the parisons. Specifically, the injection blow molding process may comprise injection molding a resin into a plurality of parisons at the injection station 46. As depicted in FIG. 1, the injection station may be fluidly coupled with the resin source 32, the resin feed system 34, the heat transfer fluid source 36, and the temperature control system 38 and/or unit 40. The injection station 46 may comprise at least a portion of the resin feed system 34, as illustrated in FIG. 4. For example, the resin feed system 34 may comprise or be fluidly coupled with an injection manifold 58 and one or more nozzles 60 positioned and configured for injecting resin into the one or more parison cavities.

Referring again to FIG. 2, the blowing station 48 may be configured for blow molding the parisons into the molded articles and the injection blow molding process may include the steps of transferring the parisons from the injection station 46 to the blowing station 48 and then blow molding the parisons formed at the injection station 46 into molded articles at the blowing station 48.

As shown in FIG. 3B, the blowing station 48 may comprise an upper die shoe 62, a lower die shoe 64, an upper mold half 66 coupled to the upper die shoe 62, and a lower mold half 68 coupled to the lower die shoe 64. The upper die shoe 62 and/or the lower die shoe 64 may be movable toward and away from each other, moving the blowing station 48 between an open position and a closed position. For example, the upper die shoe 62 and its corresponding upper mold half 66 may move upward and downward on a blowing station guide pin 70 fixed relative to the lower die shoe 64 and/or the lower mold half 68.

As shown in FIGS. 2 and 3C, the ejection station 50 may comprise a stripper plate 72 or any other device configured for pushing, pulling, dumping, or otherwise stripping the parisons off of the core rods 54 once they have been blow molded. For example, once the indexing head 44 moves the molded articles from the blowing station 48 to the ejection station 50, the stripper plate may be inserted adjacent to a top edge of the necks of the molded articles, between the necks and a center point of the indexing head 44. Then the stripper plate 72 may be moved laterally away from the center point of the indexing head 44, thus stripping the core rods 54 of the molded articles resting thereon.

In some embodiments of the IBM machine 42 described above, a conventional indexing head 44, blowing station 48, and/or ejection station 50 may be used. However, the injection station 46 disclosed herein may comprise a multitude of improvements over prior art injection stations. Referring now to FIGS. 3a and 4-7, in various embodiments of the IBM machine 42 described herein, the injection station 46 may comprise first and second die sets 74,76, a split parison mold assembly 78 comprising first and second parison mold halves 80,82 coupled to the first and second die sets 74,76 respectively, and a plurality of heat transfer channels 84 (dashed lines in FIGS. 6 and 7) defined within the die sets 74,76 and/or the split parison mold assembly 78 for regulating a temperature of the parison forming surfaces of the split parison mold assembly 78. The first and second parison mold halves 80,82 may also be referred to herein as first and second mold half assemblies. When the pair of first and second die sets 74,76 is shifted from an open position to a closed position, the first and second parison mold halves may cooperatively define one or more parison cavities 86. In some embodiments of the injection station 46, the first and/or second die sets 74,76 may slide along an injection station guide pin 88 when actuated between the open and closed positions.

The first and second die sets 74,76 (also referred to herein as upper and lower die sets of the injection station 46) may be formed of nickel plate or other die set materials known in the art. The die sets 74,76 may be shiftable between the open position and the closed position, as mentioned above. The injection blow molding process may therefore include a step of shifting the first and second die sets 74,76 of the injection molding station 46 from the open position to the closed position and from the closed position to the open position. At least one of the die sets 74,76 may be configured to actuate toward and away from the other of the die sets 74,76. For example, the first die set 74 may move toward and away from the second die set 76 along the injection station guide pin 88.

Figure 13:
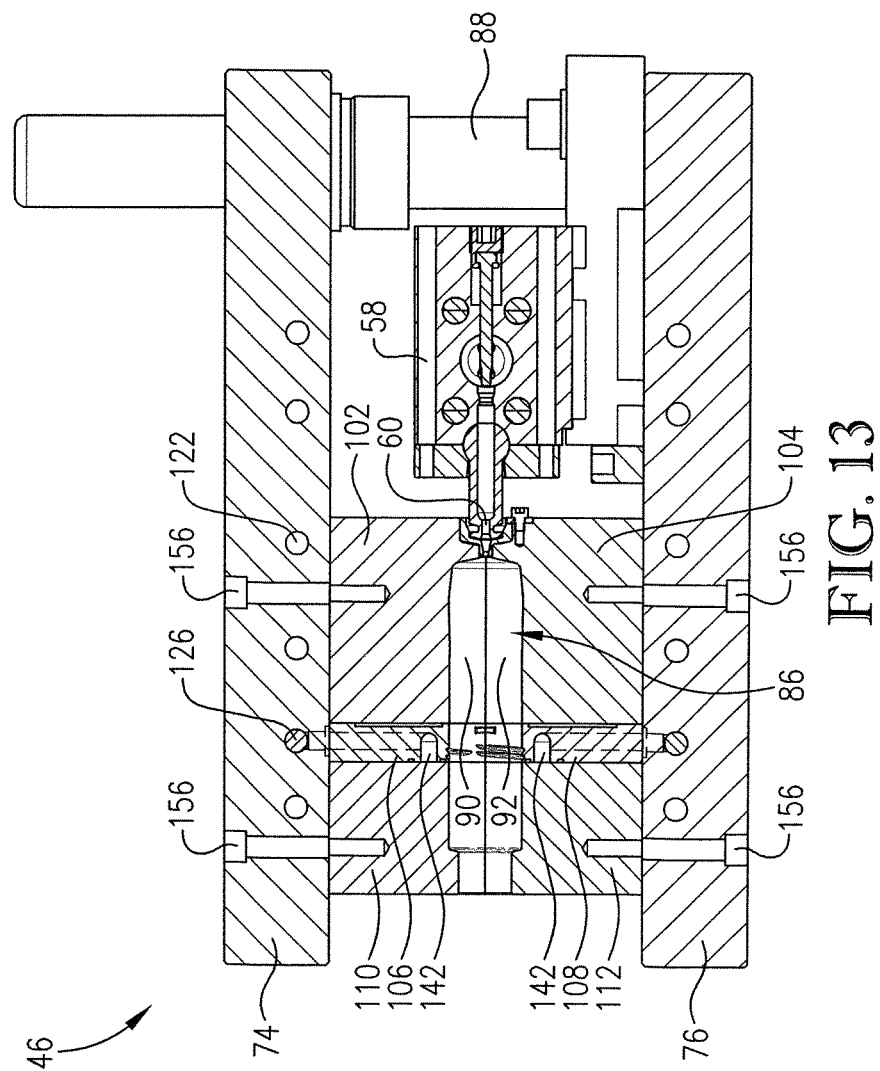
FIG. 13 is a cross-sectional side view of the injection station taken along line 13-13 in FIG. 9.

The first and second parison mold halves 80,82 of the split parison mold assembly 78 may be directly coupled to the first and second die sets 74,76 respectively. As used herein, the term "directly coupled" denotes connection of a first component to a second component in a manner such that at least a portion of the first and second components physically contact one another. The first parison mold half 80 may have a first parison cavity surface 90 (FIG. 13) and the second parison mold half 82 may have a second parison cavity surface 92 (FIG. 13). When the split parison mold assembly 78 is in the closed position, the first and second parison cavity surfaces 90,92 may define the one or more parison cavities 86 within which the resin is received. The resin feed system 34 may be coupled in fluid-flow communication with the parison cavities 86 and operable to inject the resin into the parison cavities 86.

The injection blow molding process may include injection molding a polyolefin resin into a plurality of parisons at the injection station 46. This injection molding process may comprise shifting the split parison mold assembly 78 from the open position to the closed position, then introducing or injecting the resin, such as polyolefin resin, into the parison cavities 86 cooperatively defined by the first and second parison cavity surfaces 90,92 of the split parison mold assembly 78 when the split parison mold assembly 78 is in the closed position. The resin fills the parison cavities 86 and may remain therein until it hardens to a point at which it can at least temporarily hold its shape when the split parison mold assembly 78 is opened. Then the die sets 74,76 may be shifted from the closed position to the open position and the parisons may be removed from the parison mold halves 80,82 while the die sets 74,76 are in the open position.

Figure 14:
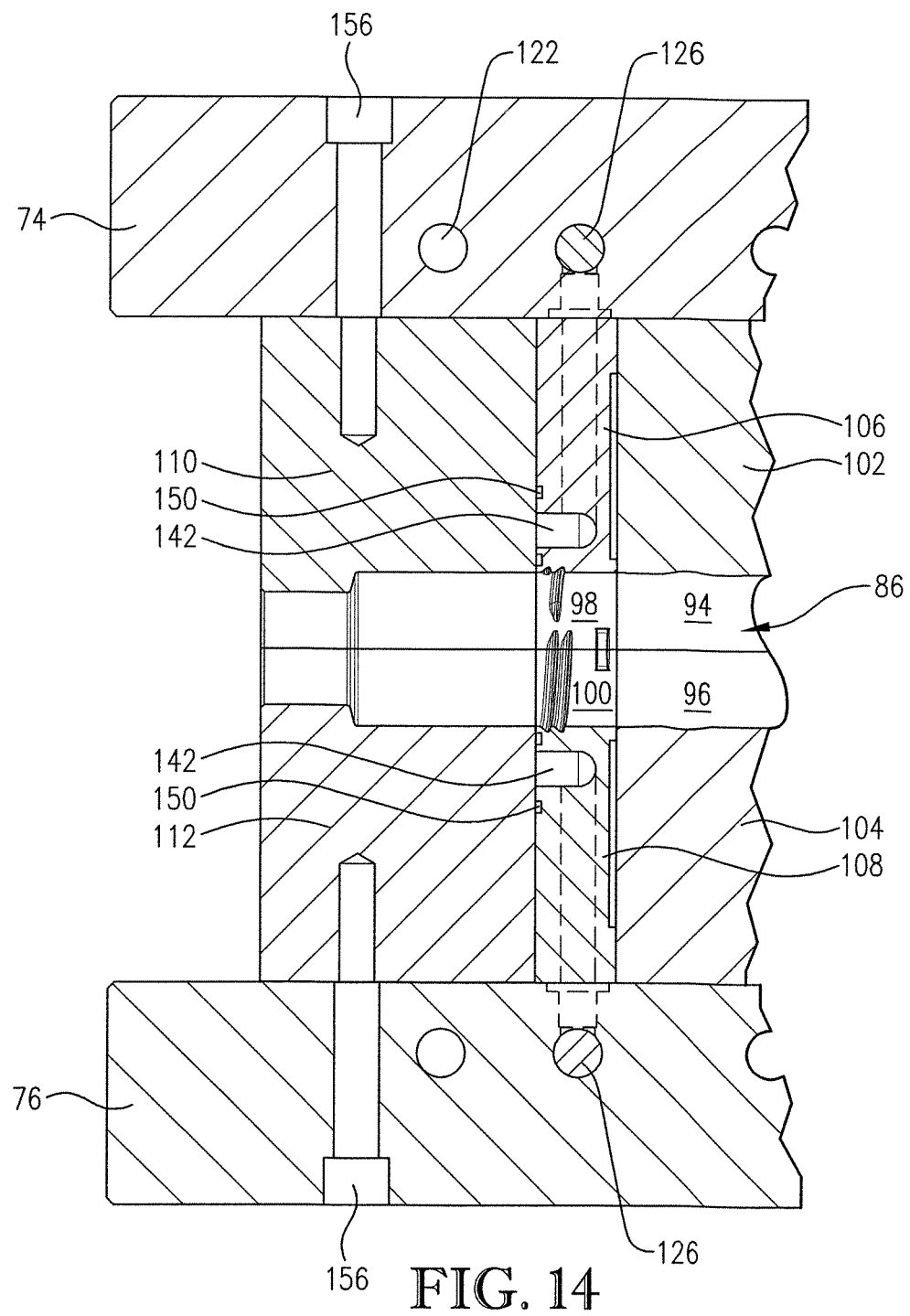
FIG. 14 is a fragmentary, cross-sectional, enlarged side view of the neck mold halves as illustrated in FIG. 14, particularly illustrating how the portion of the heat transfer channel closest to the surface of the parison cavity is cooperatively defined by the neck mold halves and interlock insert halves.

As perhaps best illustrated in FIGS. 13 and 14, each of the parison cavity surfaces 90,92 may comprise a body-forming surface 94,96 for defining the exterior shape of the bodies of the parisons and a neck-forming surface 98,100 for defining the exterior shape of the necks of the parisons when the split parison mold 78 is in the closed position.

In various embodiments of the injection station 46, the split parison mold assembly 78 may comprise first and second body mold halves 102,104, first and second neck mold halves 106,108, and first and second interlock insert halves 110,112 coupled to the first and second die sets 74,76 respectively. The neck-forming surfaces 98,100 (FIG. 14) may be formed into the neck mold halves 106,108 and the body-forming surfaces 94,96 may be formed into the body mold halves 102,104, respectively.

In some embodiments of the injection station 46, the body mold halves 102,104 are each monolithic components having a plurality of the parison body-forming surfaces 94,96 formed therein via a molding or milling manufacturing process. As used herein, the term "monolithic" means formed of a single body or member; not of multiple bodies or members fastened together. The monolithic body mold halves 102,104 may be configured such that the first body mold half 102 and the second body mold half 104 cooperatively define the exterior shape of the bodies of at least two, at least four, or at least six of the parisons. In other embodiments of the injection station 46, as described below, the body mold halves 102,104 may each comprise a plurality first body mold halves 102 and a plurality of second body mold halves 104 each independently coupled to one of the die sets 74,76, with each first body mold half 102 and each corresponding second body mold half 104 comprising at least one body-forming surface 94,96 formed therein.

The first and second neck mold halves 106,108 can be directly coupled to the first and second die sets 74,76 respectively, and are disposed between the first and second body mold halves 102,104 and the first and second interlock inserts 110,112 respectively.

In some embodiments of the injection station 46, the neck mold halves 106,108 are each monolithic components having a plurality of the parison neck-forming surfaces 98,100 formed therein via a molding or milling manufacturing process. The monolithic neck mold halves 106,108 may be configured such that the first neck mold half 106 and the second neck mold half 108 cooperatively define the exterior shape of the necks of at least two, at least four, or at least six of the parisons.

In other embodiments of the injection station 46, as described below, the neck mold halves 106,108 may each comprise a plurality first neck mold halves 106 and a plurality of second neck mold halves 108 each independently coupled to one of the die sets 74,76, with each first neck mold half 106 and each corresponding second neck mold half 108 comprising at least one neck-forming surface 98,100 formed therein.

The first and second interlock inserts 110,112 (also referred to herein as interlock insert halves) may be directly coupled to the first and second die sets 74,76 respectively, adjacent to the first and second neck mold halves 106,108. The first and second neck mold halves 106,108 may be disposed between the first and second interlock inserts 110,112 and the first and second body mold halves 102,104 respectively. The interlock insert halves 110,112 along with the first and second neck mold halves 106,108 may cooperatively form at least a portion of the heat transfer channels 84, as later described herein.

The heat transfer channels 84, as illustrated in FIGS. 6-10, are formed in the die sets 74,76 and/the parison mold halves 80,82 and are configured to receive the heat transfer fluid. For example, the heat transfer channels 84 may be configured to receive heat transfer fluid from the heat transfer fluid source 36 and pass the heat transfer fluid from heat transfer channels 84 defined within the first and second die sets 74,76 into heat transfer channels 84 defined within the first and second parison mold halves 80,82 respectively. Heat transfer fluid may be passed through the plurality of heat transfer channels 84 defined within the injection station 46 to regulate the temperature of at least a portion of the parison cavity surfaces 90,92.

The heat transfer channels 84 may be coupled in fluid-flow communication with the heat transfer fluid source 36 and the temperature control system 38. The temperature control system 38 may thus control the temperature of the heat transfer fluid fed into the heat transfer channels 84. In some embodiments of the injection blow molding system 30, there may be one or more temperature control systems 38 or temperature control units 40, but only one of the temperature control units 40 may be associated with the injection station 46 and its heat transfer channels 84. The injection molding process described herein may therefore further comprise passing the heat transfer fluid from a single temperature control unit 40 through all the heat transfer channels 84 defined within the injection station 46. In some embodiments of the injection blow molding system 30, all of the heat transfer fluid passed through the heat transfer channels 84 enters the injection station 46 at substantially the same temperature.

The injection station 46 may define one or more inlets 114,116 for receiving the heat transfer fluid from the temperature control unit 40 and one or more outlets 118,120 for allowing fluid to flow out of the heat transfer channels. In some embodiments of the injection blow molding system 30, the injection station 46 may define no more than two inlets 114,116 for receiving the heat transfer fluid from the temperature control unit 40 the heat transfer fluid from the temperature control unit 40 into the heat transfer channels 84. For example, each of the first and second die sets 74,76 may comprise only one inlet 114,116, respectively, for receiving fluid to be passed through all of the heat transfer channels 84 defined with that die set and associated parison mold half.

As noted above, at least a portion of the heat transfer channels 84 may be defined within the first and second die sets 74,76. Furthermore, at least a portion of the heat transfer channels 84 may be defined within the first and second parison mold halves 80,82. For example, at least a portion of the heat transfer channels 84 may be defined within the first and second neck mold halves 106,108 of the first and second parison mold halves 80,82. The heat transfer channels 84 defined within the first and second parison mold halves 80,82 may be connected in fluid-flow communication with at least a portion of the heat transfer fluid channels 84 defined within the first and second die sets 74,76. For example, heat transfer fluid can be supplied to heat transfer channels 84 defined within the first and second parison mold halves 80,82 by heat transfer channels 84 defined within the first and second die sets 74,76 respectively.

Figure 8:
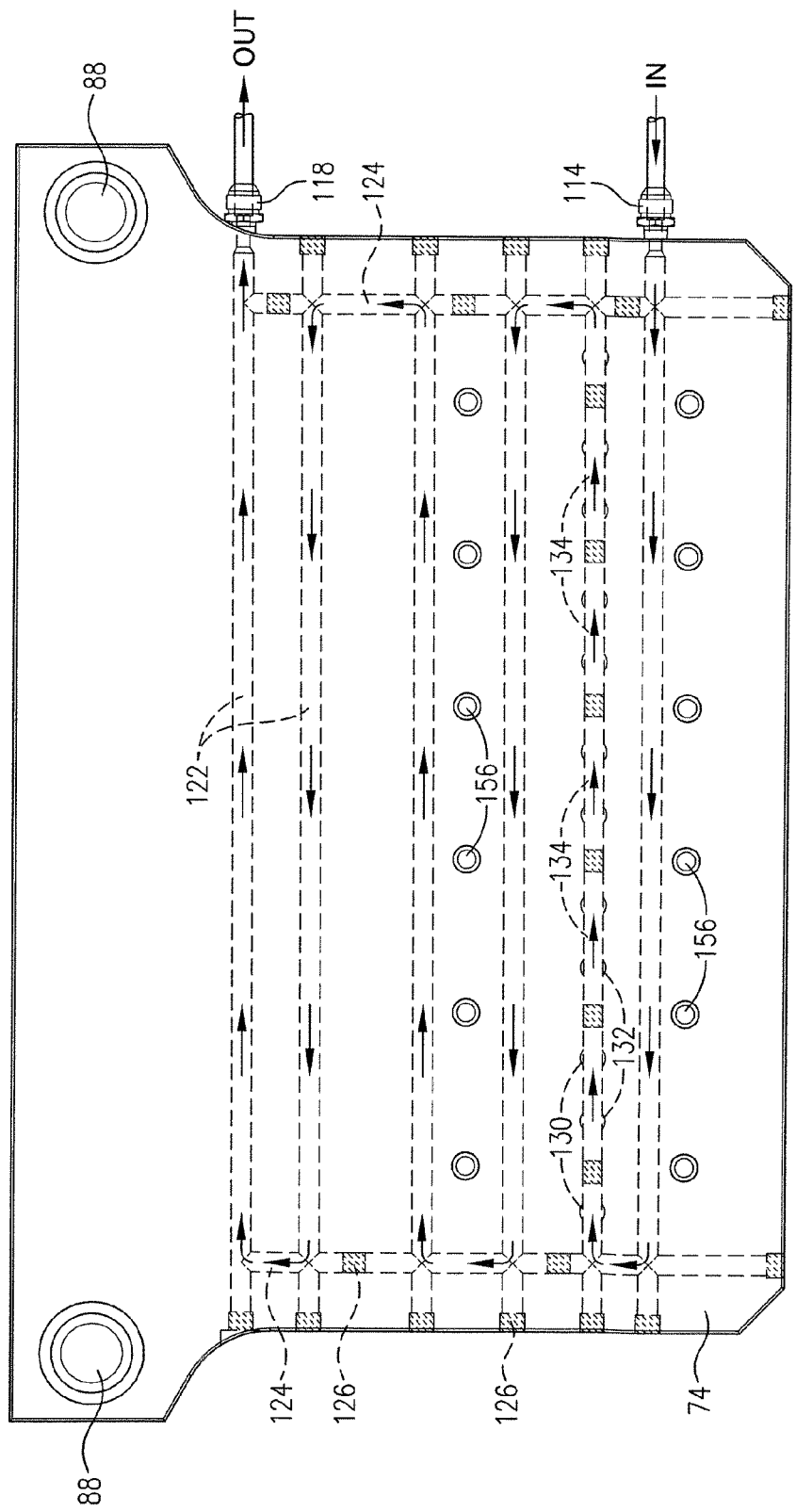
FIG. 8 is a top view of the injection station of FIG. 5 illustrating the heat transfer channels in phantom and includes arrows depicting the direction of flow of heat transfer fluid through the heat transfer channels from an inlet to an outlet thereof.

As perhaps best illustrated in FIG. 8, all of the heat transfer channels 84 defined within the first die set 74 may be connected in serial fluid-flow communication, and all of the heat transfer channels 84 defined within the second die set 76 may be connected in serial fluid-flow communication. As used herein, "serial fluid-flow communication" denotes the connection of multiple fluid carrying bodies or channels in a manner such that fluid flows sequentially through the multiple bodies or channels. The heat transfer channels 84 defined within each of the first and second die sets 74,76 may comprise a plurality of spaced-apart, substantially linear channels 122. In some embodiments of the injection station 46, each of the die sets may comprise a minimum of 2, 3, or 4 of the linear channels 122 and a maximum of 40, 20, or 8 of the linear channels 122. Each of the linear channels 122 may have a length of at least 6, 12, or 16 inches and/or not more than 60, 48, or 36 inches. Furthermore, the linear channels 122 may extend substantially parallel to one another. The average lateral spacing between adjacent ones of the linear channels 122 may be at least 0.5, 0.75, 1.0, or 1.25 inches and/or not more than 8, 6, 4, or 2 inches. Furthermore, the average diameter of the linear channels 122 in the die sets 74,76 may be at least 0.05, 0.15, or 0.25 inches and/or not more than 3.0, 1.5, or 0.75 inches.

As mentioned above, the linear channels 122 may be coupled in serial fluid-flow communication with one another. For example, one or more crossing heat transfer channels 124 may be positioned proximate one or more ends of the linear channels 122 and may provide fluid communication between adjacent ones of the linear channels 122. For example, the linear channels 122 and the crossing channels 124 may cooperatively define heat transfer channels that snake back and forth laterally across each of the die sets 74,76. For example, the heat transfer fluid may travel in a first direction through a first one of the linear channels 122, enter a first one of the crossing channels 124 or a first portion of one of the crossing channels 124, and then flow in a second, opposite direction through a second one of the linear channels 122. In some embodiments of the injection station 46, plugs 126 may be strategically placed throughout the linear channels 122 and/or the crossing channels 124, thereby directing the flow of the heat transfer fluid, as illustrated in FIG. 8. Furthermore, the plugs 126 may also be placed at or into each end of the linear and crossing channels 122,124 to prevent heat transfer fluid from entering or exiting at any locations other than the inlets 114,116 and outlets 118,120.

Figure 10:
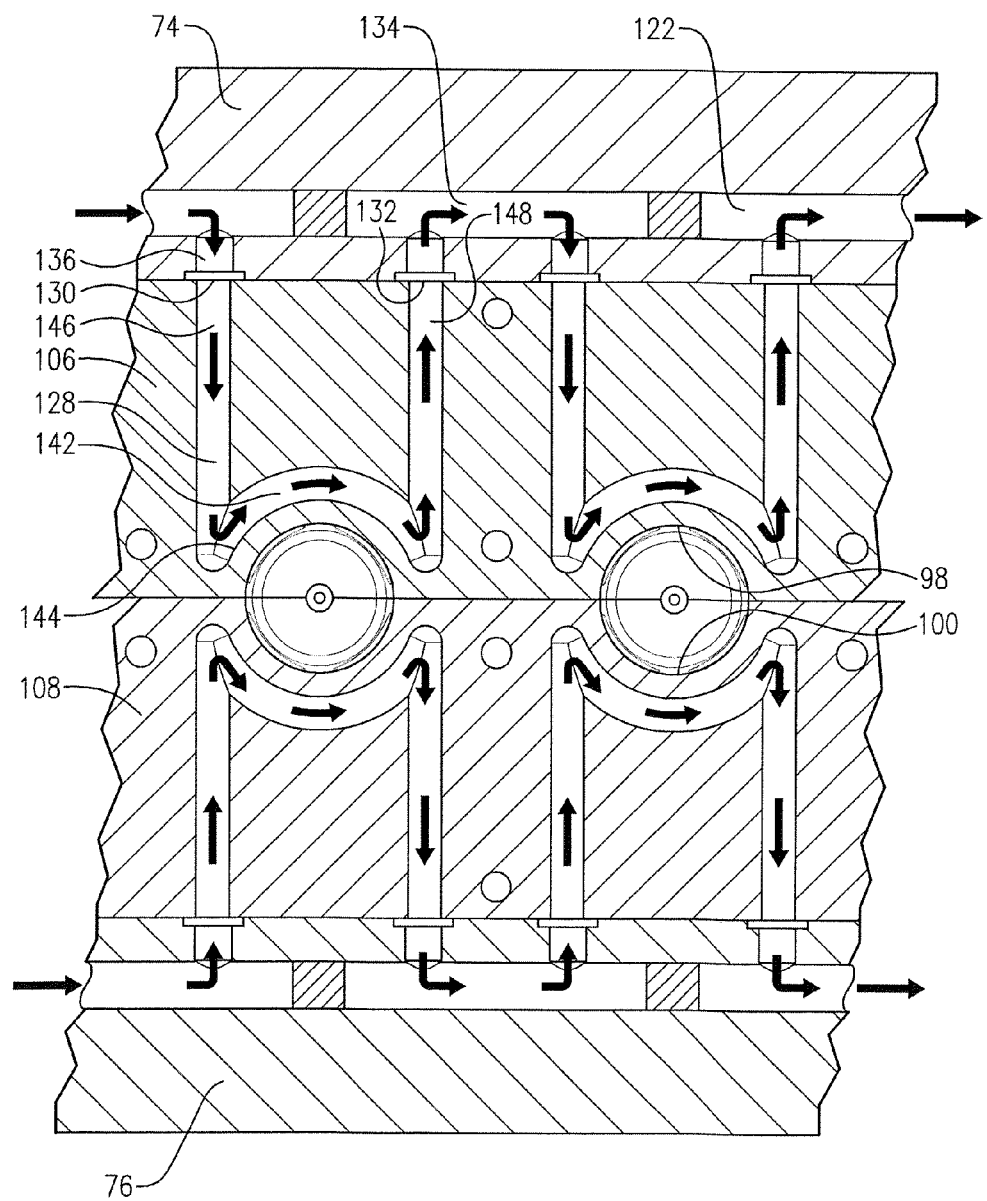
FIG. 10 is a fragmentary cross-sectional view of the heat transfer channels taken along line 10-10 in FIG. 7, including arrows depicting the direction of flow of heat transfer fluid through the heat transfer channels in the die sets to the heat transfer channels in the neck mold halves.
Figure 11:
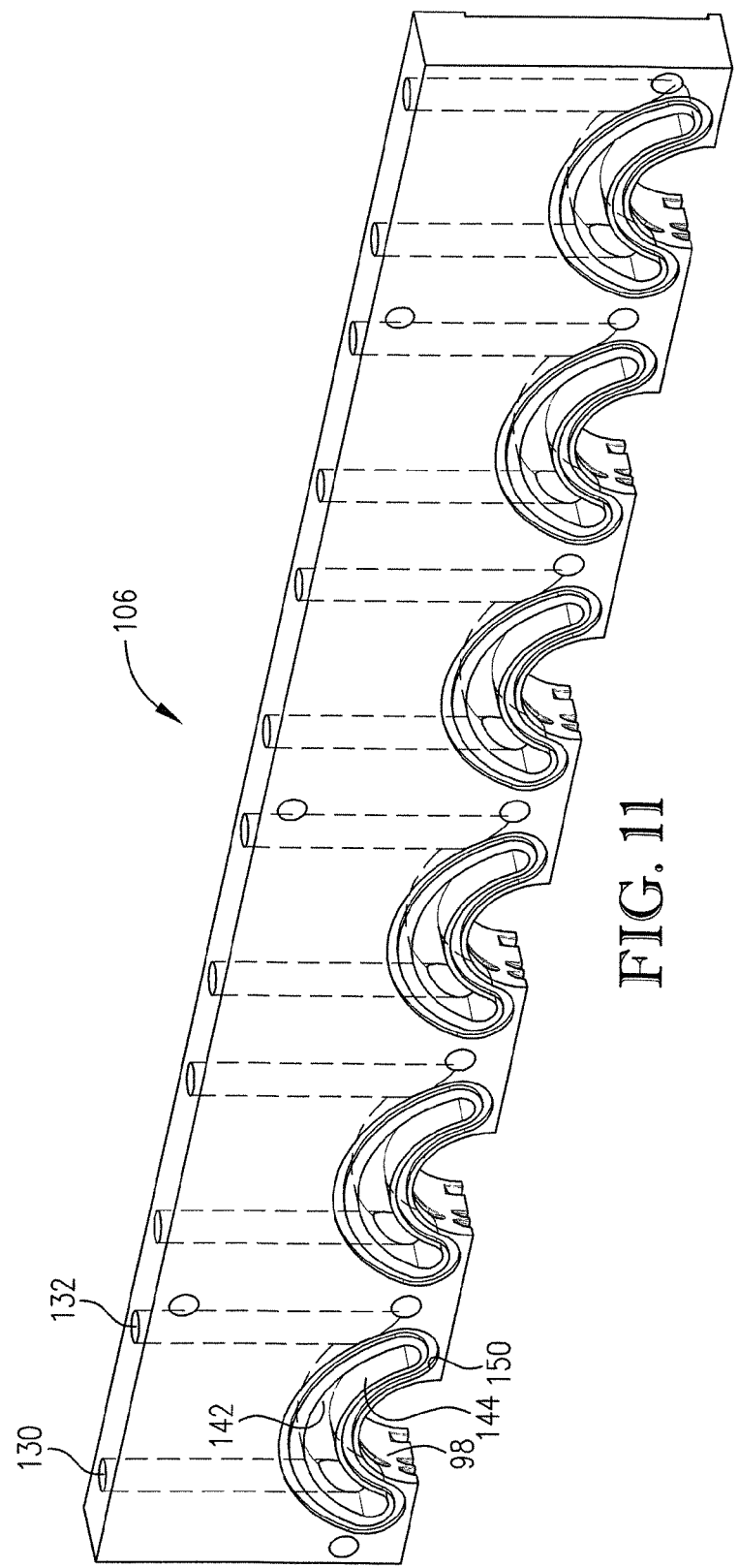
FIG. 11 is an isometric view of the upper neck mold half of FIG. 4 illustrating the open-sided configuration of the contoured heat transfer channels, as well as the interlock seal recesses formed around the contoured channels.
Figure 12:
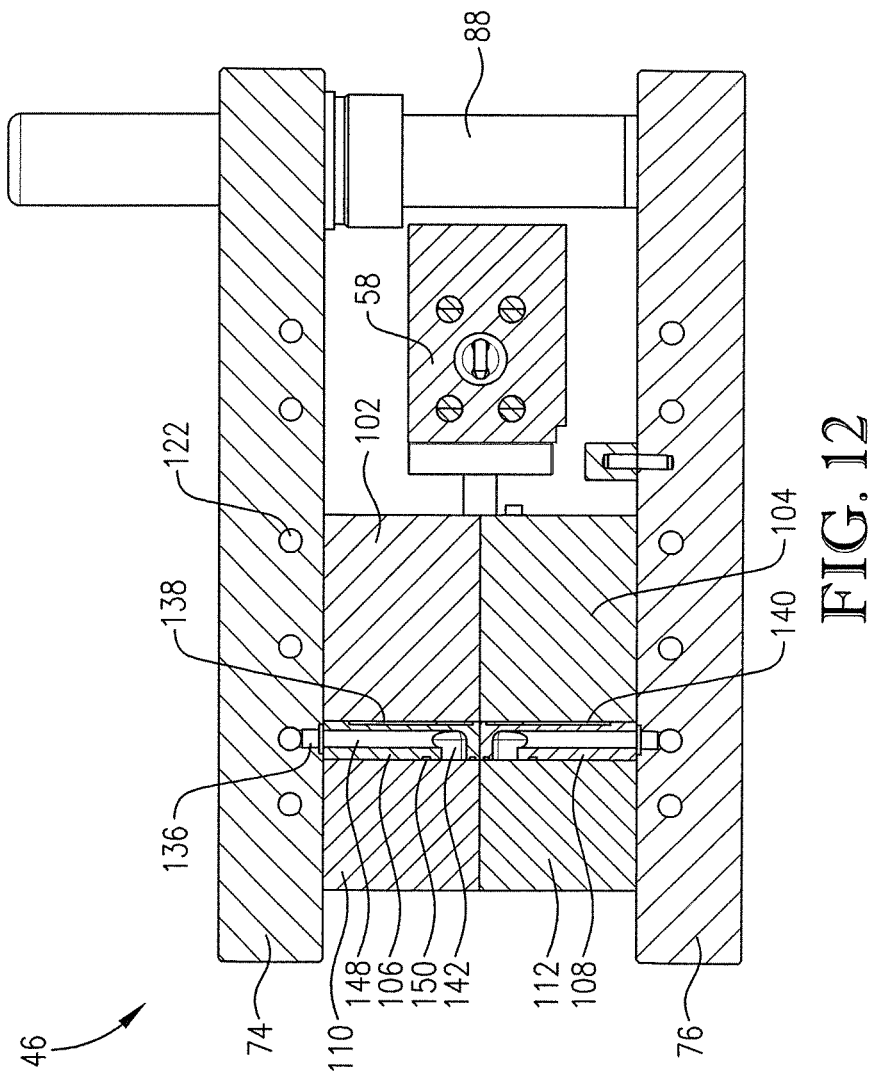
FIG. 12 is cross-sectional side view of the injection station taken along line 12-12 in FIG. 9.

At least a portion of the heat transfer channels 84 defined within the die sets 74,76 connect the heat transfer channels 84 defined within the parison mold halves 80,82 in serial fluid-flow communication with one another. As illustrated in FIG. 10, the parison mold halves 80,82 may each define at least two spaced-apart heat transfer channels, referred to herein as mold half channels 128. The mold half channels 128 may be formed in the body mold halves 102,104 and/or the neck mold halves 106,108, as later described herein. Specifically, the first and second die sets 74,76 may each comprise at least one connecting heat transfer channel or one connecting portion of one of the linear channels that provides fluid communication between the mold half channels 128. For example, the mold half channels 128 may each have an inlet end 130 and an outlet end 132 in fluid communication with at least one of the linear channels 122 in the die sets. The linear channel 122 may have one of the plugs 126 placed therein between the inlet end 130 and the outlet end 132 of one of the mold half channels 128 to redirect the heat transfer fluid into that mold half channel 128. The space between adjacent ones of the plugs 126 within the linear channels 122 in fluid communication with the mold half channels 128 may be referred to herein as a connecting portion or a connecting heat transfer channel 134, because it fluidly connects the outlet end 130 of one mold half channel 128 with the inlet end 132 of another mold half channel 128, as illustrated in FIG. 10.

The inlet end 130 and the outlet end 132 of the mold half channels 128 may each be fluidly connected with the at least one of the linear channels 122 via extension channels 136. In some embodiments of the injection station 46, the extension channels 136 may extend downward from and substantially perpendicular to at least one of the linear channels 122.

In some embodiments of the injection station 46, the total volume of the heat transfer channels 84 may be at least 10, 20, or 40 cubic inches and/or not more than 500, 250, or 100 cubic inches. Additionally, the total volume of the heat transfer channels 84 defined within the first and second die sets 74,76 may be at least 5, 15 or 30 cubic inches and/or not more than 400, 200, or 80 cubic inches. The total volume of the heat transfer channels 84 defined within the first and second parison mold halves 80,82 may be at least 1, 3, or 5 cubic inches and/or not more than 100, 50, or 20 cubic inches. The total volume of the heat transfer channels 84 defined within the first and second body mold halves 102,104 may be less than 30, 15, or 5 cubic inches, and the total volume of the heat transfer channels 84 defined within the first and second neck mold halves 106,108 may be at least 1, 3, or 5 cubic inches and/or not more than 100, 50, or 20 cubic inches.

The ratio of the total volume of the heat transfer channels 84 defined within the die sets 74,76 to the total volume of heat transfer channels 84 defined in the split parison mold assembly 78 may be at least 1:1, 2.5:1, or 3.5:1 and/or not more than 20:1, 12:1, or 8:1. The ratio of the total volume of the heat transfer channels 84 defined within the die sets 74,76 to the total volume of heat transfer channels 84 defined in the body mold halves 102,104 may be at least 1:1. Thus, less than 50, 30, 25, 15, or 10 percent of the total volume of the heat transfer channels 84 in the injection station 46 may be defined within the body mold halves 102,104. For example, in some embodiments of the injection station 46 none of the heat transfer channels 84 are defined within the body mold halves 102,104. In various embodiments of the injection station 46, at least 50, 60, or 70 percent of the total volume of the heat transfer channels 84 is located in heat transfer channels that are spaced more than 1, 3, or 5 inches from the parison cavity surfaces 90,92.

In some embodiments of the injection station 46, at least 20, 30, 50, or 70 percent and/or not more than 98, 95, or 90 percent of the total volume of the heat transfer channels 84 is defined within the die sets 74,76. In some embodiments of the injection station 46, at least 2, 5, or 10 percent and/or not more than 80, 50, or 30 percent of the total volume of the heat transfer channels 84 is defined within the split parison mold assembly 78. In some embodiments of the injection station 46, at least 2, 5, or 10 percent and/or not more than 80, 50, or 30 percent of the total volume of the heat transfer channels 84 may be defined within the neck mold halves 106,108.

It may be desirable for the body-forming surfaces 94,96 of the parison molds 80,82 to stay within target temperature ranges during the injection molding process. In some embodiments of the injection station 46, the target surface temperature of the body-forming surfaces (i.e., the target body surface temperature) may be at least 190, 200, or 205° F. and/or not more than 230, 220, or 215° F.

During the injection molding, while the resin is received in the parison cavities 86, the surface temperature of at least 70, 80, or 90 percent of the total surface area of the body-forming surfaces 94,96 of the split parison mold assembly 78 may be maintained at or within 20, 10, or 5° F. of the target body surface temperature. For example, a target body surface temperature may be 210° F., and during the injection molding, the temperature of at least 90 percent of the total surface area of the body-forming surfaces 94,96 may be maintained between 205 and 215° F.

During the injection molding, the temperature of at least 70, 80, or 90 percent of the total surface area of the neck-forming surfaces 98,100 may be maintained within 20, 10, or 5° F. of a target neck surface temperature. For example, the temperature of at least 70, 80, or 90 percent of the total surface area of the neck-forming surfaces 98,100 may be maintained within a range having a minimum of 50 or 75° F. and a maximum of 150 or 175° F. In some embodiments of the injection station 46, the target neck surface temperature may be at least 10, 25, or 50° F. less than the target body surface temperature. For example, if the target neck surface temperature is in the range of 50 to 175° F. then the target body surface temperature may be in the range of 190 to 230° F. In one example embodiment of the injection station 46, the target body surface temperature may be 210° F., and the target neck surface temperature may be at least 25° F. less than the target body surface temperature.

In some embodiments of the injection station 46, at least 75, 90, or 100 volume percent of the heat transfer fluid introduced into the heat transfer channels 84 is introduced at an inlet temperature that is at or within 20, 10, or 5° F. of a target inlet temperature. The target inlet temperature may be at least 40, 50, or 60° F. and/or not more than 150, 100, or 90° F. The temperature of the heat transfer fluid may be controlled in a single temperature control unit 40 (e.g., thermolator) prior to introducing the heat transfer fluid into the heat transfer channels 84.

In certain embodiments, the neck mold halves 106,108 may be coupled to the die sets 74,76 independently of the body mold halves 102,104. A first insulating gap 138 may be defined between at least a portion of the first body mold half 102 and the first neck mold half 106, and a second insulating gap 140 may be defined between at least a portion of the second body mold half 104 and the second neck mold half 108.

As noted above, at least a portion of the heat transfer channels 84 may be defined within the first and second neck mold halves 106,108. For example, at least some of the spaced-apart heat transfer channels or mold half channels 128 may be partially or entirely defined within the first and second neck mold halves 106,108. In some embodiments of the injection station 46, at least a portion of the heat transfer channels 84 defined within the first and second neck mold halves 106,108 may be spaced at least 0.05, 0.1, or 0.15 inches and/or not more than 2, 1, or 0.5 inches from the neck-forming surfaces 98,100. In some embodiments of the injection station 46, all of the heat transfer channels 84 that are spaced less than 1 inch from the first and second parison cavity surfaces 90,92 are defined within the neck mold halves 106,108.

The heat transfer channels 84 defined in the first and second neck mold halves 106,108 may include a plurality of contoured channels 142 associated with the neck-forming surfaces 98,100. As perhaps best shown in FIG. 15, the curvature of the contoured channels 142 may substantially correspond to the curvature of the necks of the parisons to be formed at the injection station 46. Specifically, the contoured heat transfer channels 142 may include an inner face 144 having a shape that substantially corresponds to the shape of the neck-forming surface 98,100 with which it is associated.

Figure 15:
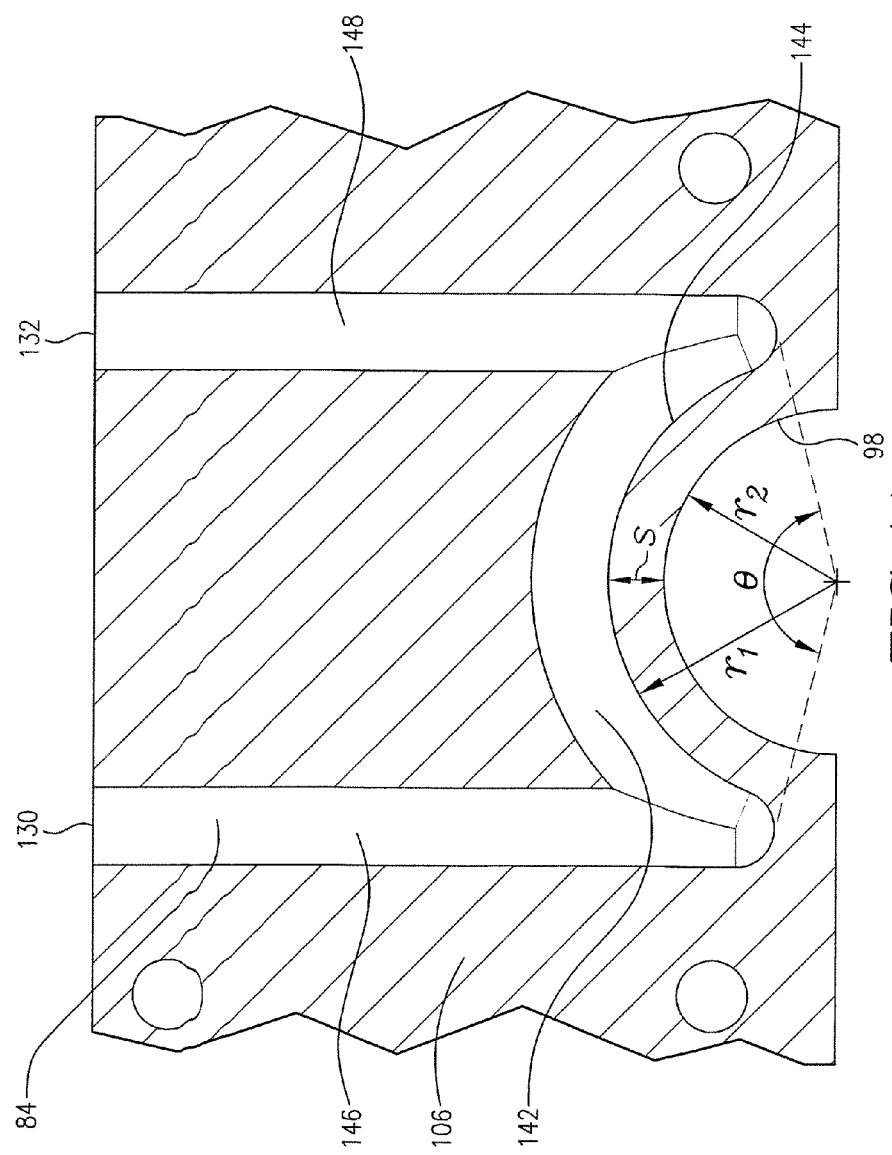
FIG. 15 is a fragmentary, cross-sectional, enlarged front view of one of the heat transfer channels in one of the neck mold halves, illustrating relationships between a neck-forming surface and its corresponding contoured channel.
Figure 16:
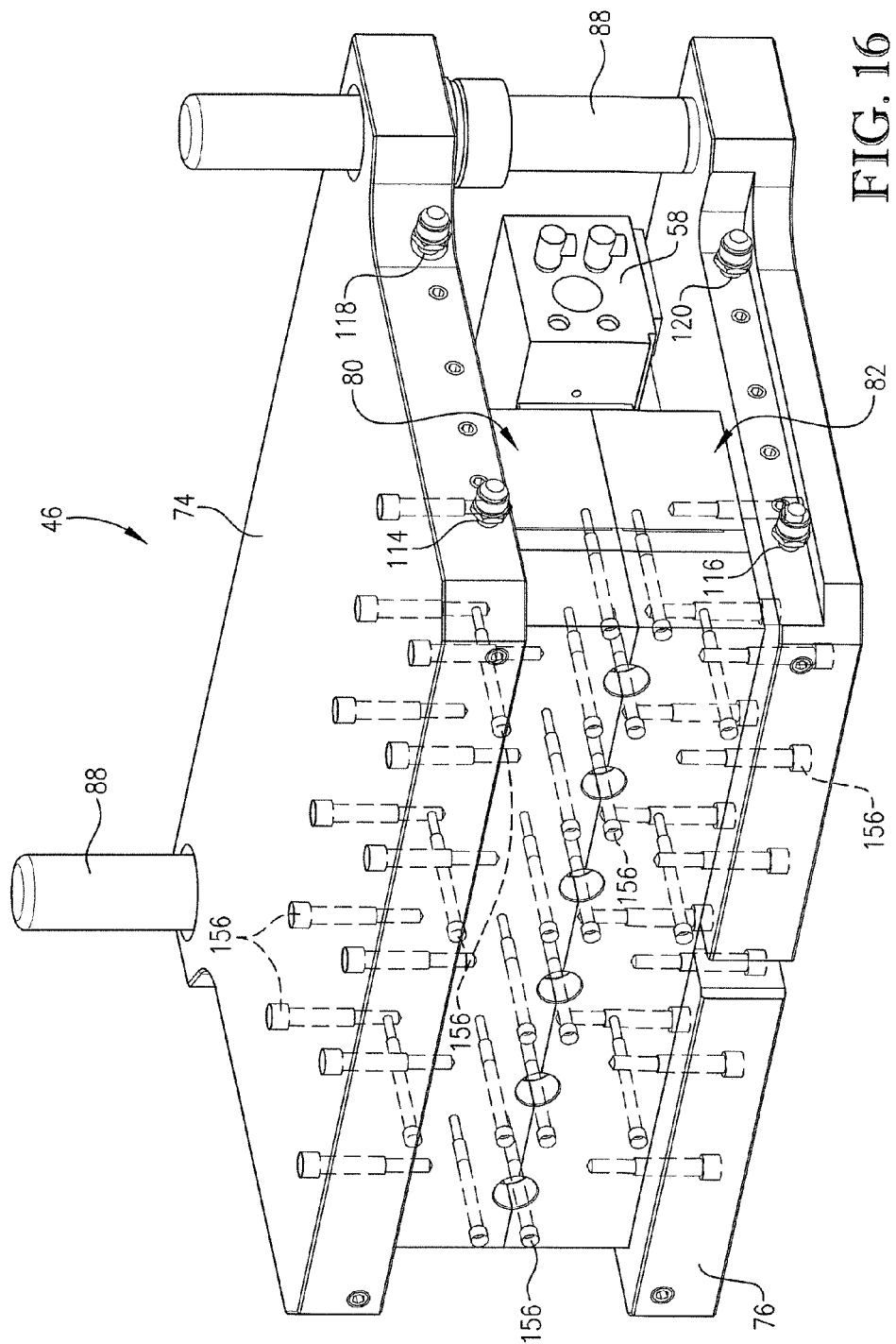
FIG. 16 is an isometric view of the injection station of FIG. 5 and illustrates a plurality of mechanical fasteners joining the split parison mold assembly with the die sets.
Figure 17:
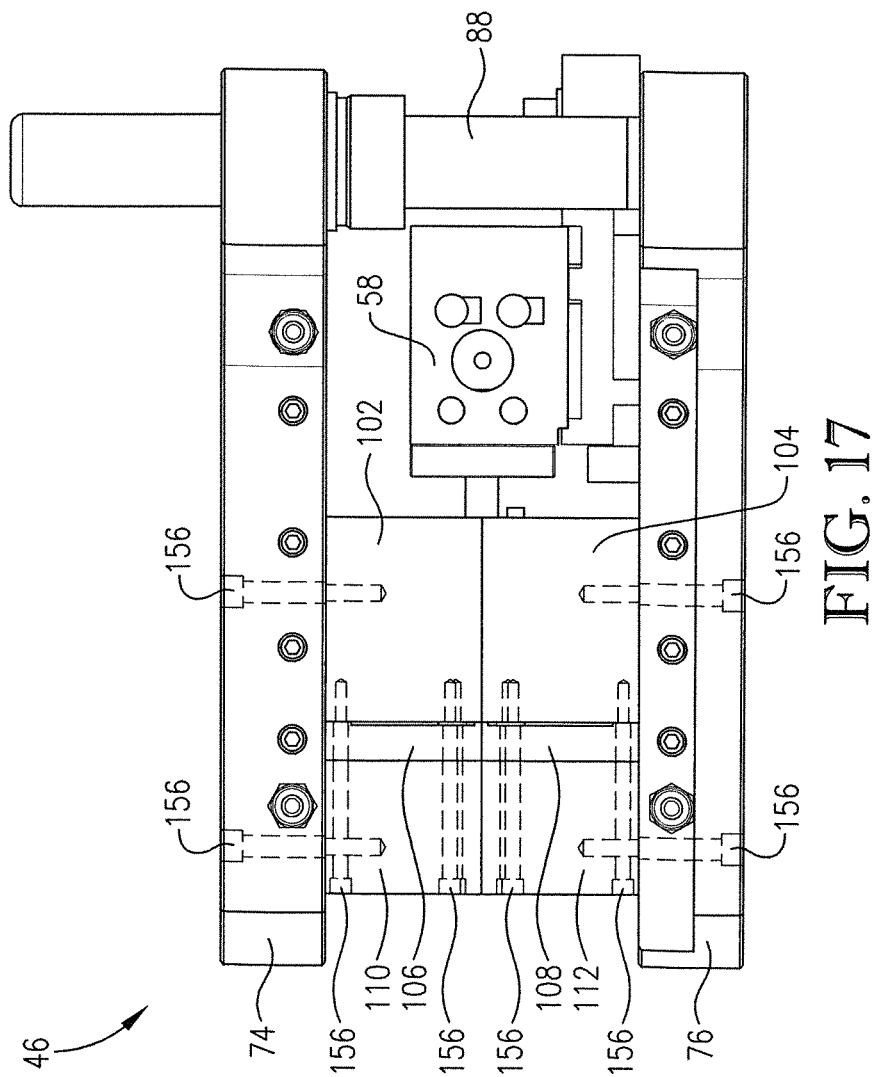
FIG. 17 is a side view of the injection station depicted in FIG. 5, particularly illustrating the mechanical fasters joining the interlock insert halves, neck mold halves, and body mold halves together and to the first and second die sets, respectively.
Figure 18:
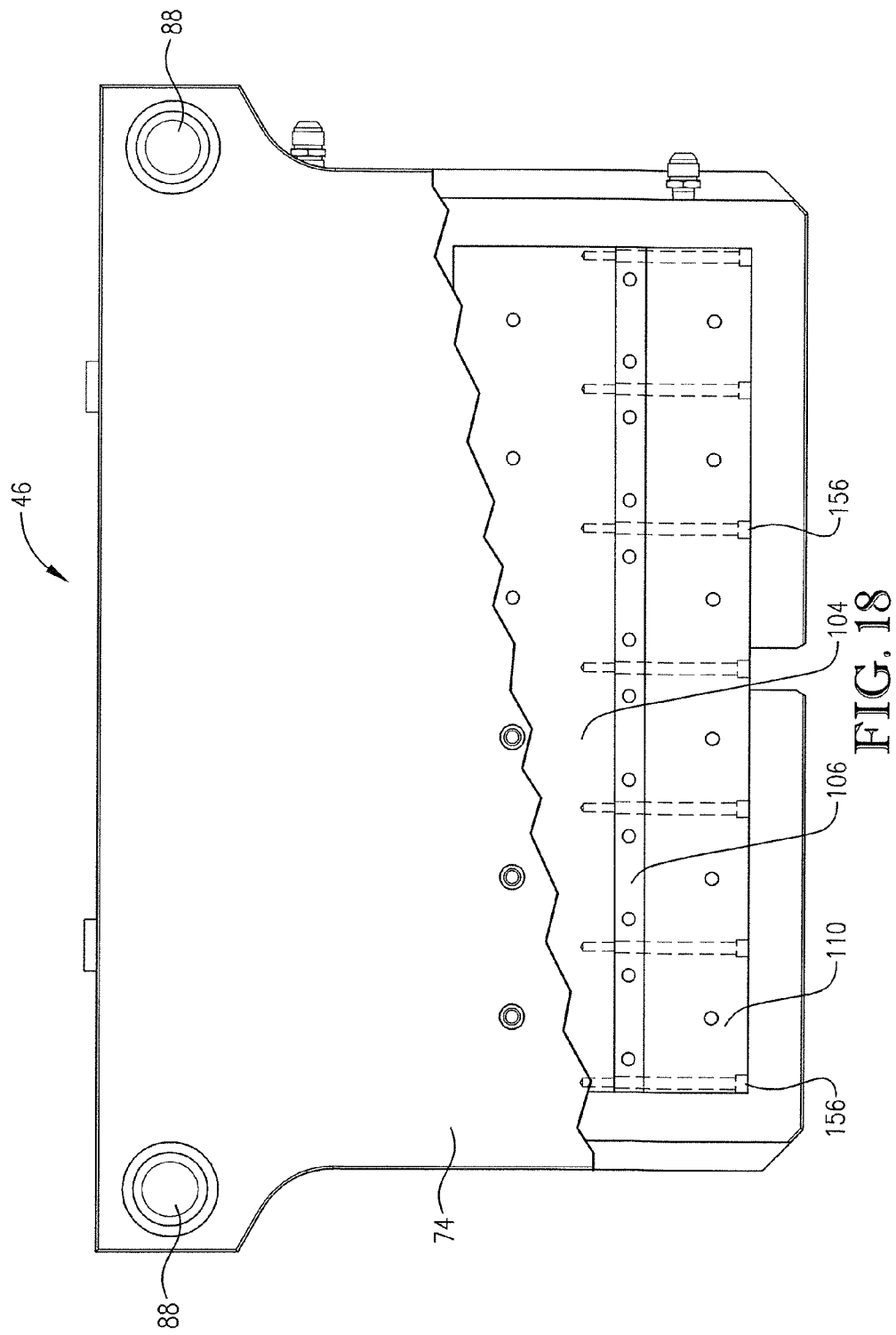
FIG. 18 is a cutaway top view of the injection station depicted in FIG. 16, particularly illustrating the spacing of the mechanical fasteners extending horizontally through the interlock insert halves, neck mold halves, and body mold halves.
Figure 19:
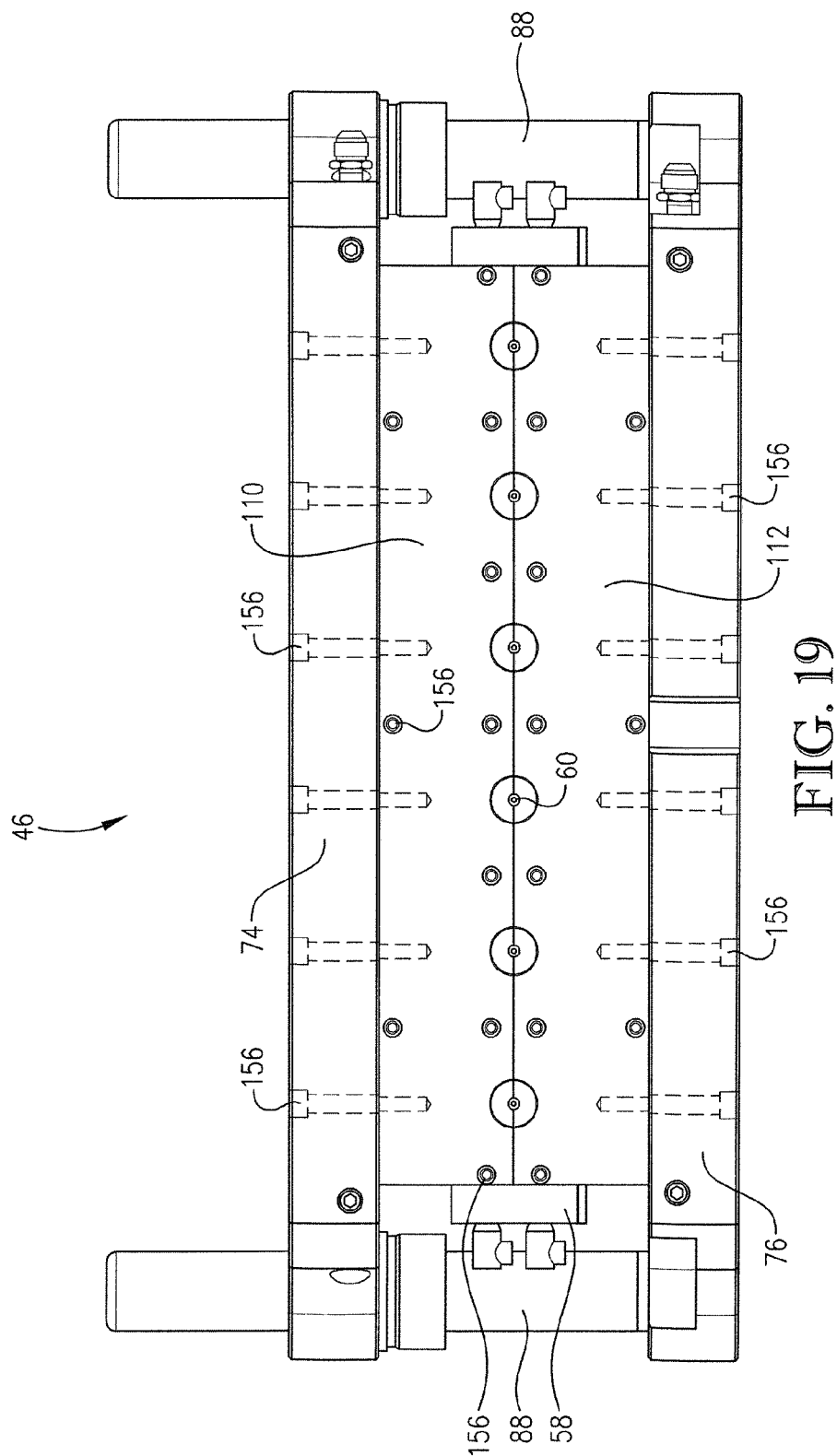
FIG. 19 is a front view of the injection station depicted in FIG. 16, particularly illustrating the spacing of the mechanical fasteners extending vertically through the first or second die set and portions of the split parison mold assembly.

As illustrated in FIGS. 14 and 15, the curvature of each of the contoured heat transfer channels 142 may be substantially concentric with the curvature of the neck of the parison with which it is associated and the neck-forming surface 98,100 with which it is associated. The inner face 144 of the contoured heat transfer channel 142 may have an arcuate shape. The inner face 144 of the contoured heat transfer channel 142 may also be spaced from the neck-forming surface 98,100 with which it is associated by a distance S (as illustrated in FIG. 15), which may be at least 0.05, 0.1, or 0.15 inches and/or not more than 2, 1, or 0.5 inches. The inner face 144 of the contoured heat transfer channel 142 may have a radius of curvature $r_1$ that is at least 0.25, 0.5, 0.75, or 1 inch and/or not more than 5, 3, or 2. Furthermore, the inner face 144 of the contoured heat transfer channel 142 may extend through an angle θ (as illustrated in FIG. 15) that is at least 90, 120, or 140 degrees and/or not more than 175 or 180 degrees. The radius of the neck-forming surface 98,100 is denoted by $r_2$ in FIG. 15. The length of each of the contoured channels 142 may be at least 1, 1.25, or 1.5 inches and/or not more than 10, 8, or 5 inches.

At least one of the contoured channels 142 may be located between and fluidly connected to a supply channel 146 and a return channel 148, with the supply channel 146 extending to the inlet end 130 and the return channel 148 extending to the outlet end 132 of the mold half channels 128. The supply and return channels 146,148 may extend from the contoured heat transfer channel 142 in a direction that is generally away from the neck-forming surface 98,100 with which the contoured heat transfer channel 142 is associated. The supply and return channels 146,148 may be substantially linear and/or parallel with each other and connected to generally opposite ends of the contoured heat transfer channel 142. The supply and return channels 146,148 may also be substantially perpendicular relative to the linear channels 122 in the die sets 74,76.

In some embodiments of the injection station 46, the first and second interlock inserts 110,112 may be disposed adjacent the first and second neck mold halves 106,108 respectively, such that at least a portion of the contoured channels 142 are cooperatively defined by the interlock inserts 110,112 and the neck mold halves 106,108, as illustrated in FIGS. 13-14. For example, the contoured channels 142 may be milled into a front face of the neck mold halves 106,108, and then the first and second interlock inserts 110,112 may be attached to the front face of the first and second neck mold halves 106,108 respectively, thereby cooperatively forming the contoured channels 142.

An interlock seal 150 may be placed around a periphery of each of the contoured channels 142 at the front face of the neck mold halves 106,108, such that the interlock seal 150 is disposed between the neck mold halves 106,108 and their corresponding interlock inserts 110,112. The interlock seal 150 may be a gasket, sealant, or any other sealing device configured to prevent heat transfer fluid from leaking between the front face of the neck mold halves 106,108 and the interlock inserts 110,112.

Figure 9:
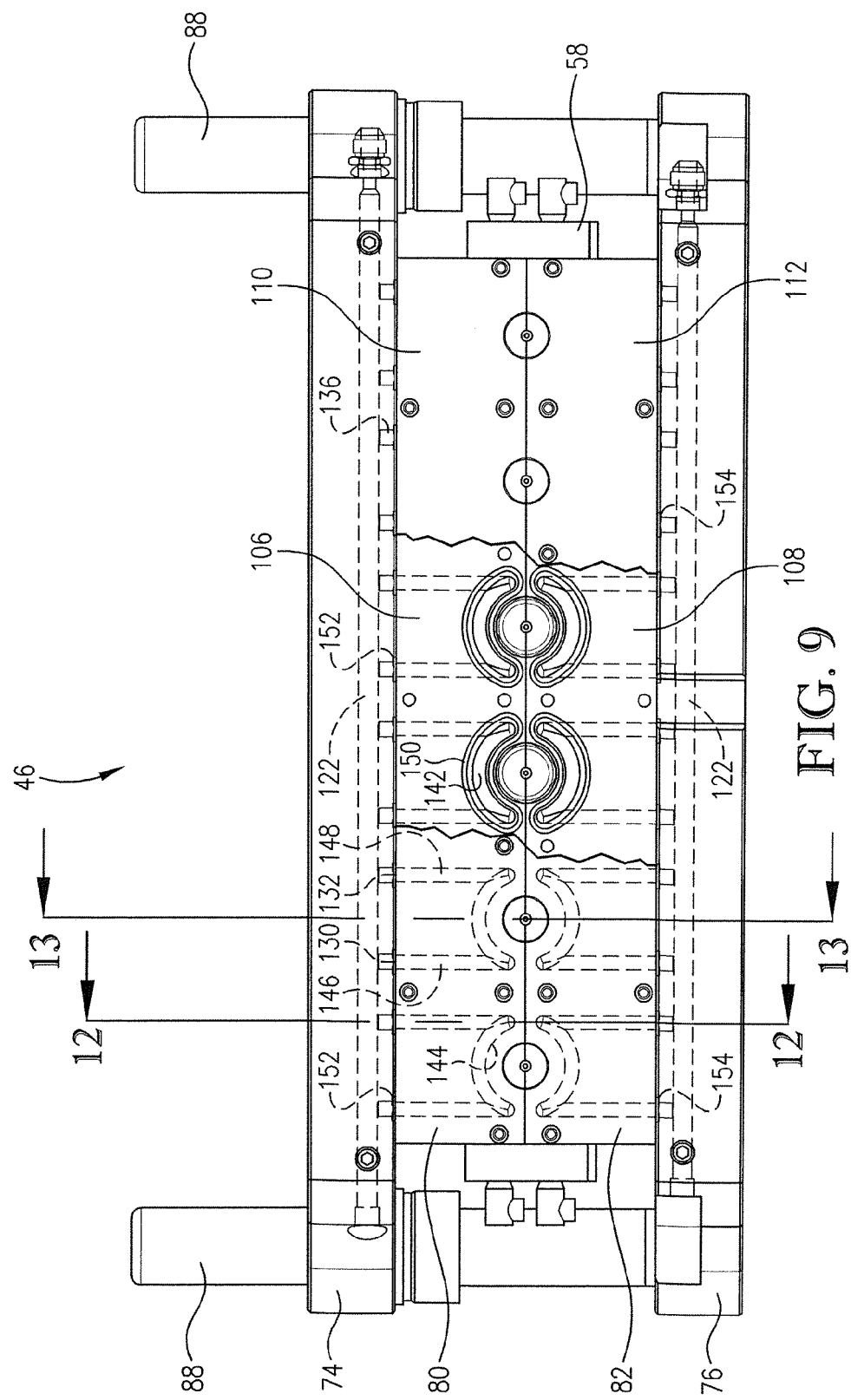
FIG. 9 is a cutaway front view of the injection station depicted in FIG. 5, particularly illustrating the configuration of the heat transfer channels in the neck molds.

As shown in FIG. 9, the injection station 46 may further comprise a plurality of first and second sealing members 152,154. The first and second sealing members may be gaskets, sealant, or any other sealing device configured to prevent heat transfer fluid from leaking between the inlet ends 130 and outlet ends 132 of the mold half channels 128 and the extension channels 136 fluidly connecting the linear channels 122 with the mold half channels 128. Each of the first sealing members 152 may be disposed between the first die set 74 and the first parison mold half 80 proximate a location where one of the heat transfer channels 84 of the first die set 74 connects in fluid-flow communication with one of the heat transfer channels 84 in the first parison mold half 80. Each of the second sealing members 154 may be disposed between the second die set 76 and the second parison mold half 82 proximate a location where one of the heat transfer channels 84 in the second die set 76 connects in fluid-flow communication with one of the heat transfer channels 84 defined in the second parison mold half 82.

Each component of the split parison mold assembly 78 may be directly attached to its corresponding die set 74,76. In some embodiments of the injection station 46, various components may be independently attached to the die sets 74,76. Specifically, the first and second body mold halves 102,104, first and second neck mold halves 106,108, and first and second interlock insert halves 110,112 may each be directly and independently coupled to the first or second die sets 74,76, respectively. Therefore, the body mold halves 102, 104, neck mold halves 106,108, and interlock insert halves 110,112 may each be independently disconnected from the die sets 74,76 without removing any of the other components.

As illustrated in FIGS. 16-19, a plurality of male threaded members may couple the first and second interlock inserts, neck mold halves, and body mold halves to one another and/or to the first and second die sets, respectively. For example, the first and second monolithic neck mold halves may be directly coupled to the first and second die sets respectively, and the first and second body mold halves may be directly coupled to the first and second die sets respectively. The coupling of these components may be accomplished using a plurality of mechanical fasteners 156.

For example, in the embodiments illustrated in FIGS. 16-19, the mechanical fasteners 156 comprise a plurality of vertically-extending male threaded members extending through the first and second die sets 74,76 and into either one of the interlock insert halves 110,112 or one of the body mold halves 102,104. In FIGS. 16-19, the mechanical fasteners 156 also include a plurality of horizontally-extending male threaded members extending through the first or second interlock insert halves 110,112, then through the first or second neck mold halves 106,108, respectively, and into the first or second body mold halves 102,104 respectively.

FIGS. 4-19 illustrate an injection station 46 with the first and a second parison mold halves 80,82, each comprising one monolithic body mold half, one monolithic neck mold half, and one monolithic interlocking insert half. However, in alternative embodiments illustrated in FIGS. 20-23, a plurality of first individual mold halves 158 and a plurality of second individual mold halves 160 are each independently attached to their respective die sets 74,76 in a spaced-apart configuration. As used herein, the term "independently coupled" denotes connection of a first component to a second component in a manner such that disconnection and removal of the first component from the second component does not require disconnection of any fasteners other than the fasteners that contact and connect both the first or second components.

In this configuration, each of the first individual mold halves 158 has a corresponding one of the second individual mold halves 160 with which it cooperates to define a single one of the parison cavities 86. In certain embodiments, each of the first individual mold halves 158 are horizontally-spaced from one another to thereby form first gaps 174 therebetween, and each of the second individual mold halves 160 are horizontally-spaced from one another to thereby form second gaps 176 therebetween.

Advantageously, no horizontally-extending fasteners are used or required to couple the first individual mold halves 158 to one another or to couple the second individual mold halves 160 to one another, since they are each independently attached to their respective die sets 74,76. Specifically, each of the first individual mold halves 158 may be coupled to the first die set 74 by one or more vertically-extending mounting fasteners 156, and each of the second individual mold halves 160 may be coupled to the second die set 76 by one or more vertically-extending mounting fasteners 156. The vertically-extending mounting fasteners may each include a male threaded portion. In this embodiment of the injection station 46, vertically-extending mounting fasteners may be the only means used to couple the first and second individual mold halves 158,160 to the first and second die sets 74,76, respectively.

The plurality of first and second mold halves 158,160 may each comprise a first and second individual body mold half 162,164, a first and second individual neck mold half 166, 168, and a first and second individual interlocking insert half 170,172 respectively. Specifically, the first and second body mold halves 102,104 may each comprise a plurality of first and second individual body mold halves 162,164, each directly and independently coupled to the first or second die set 74,76 respectively and each configured to define at least a portion of the exterior shape of the body of only one of the parisons. Furthermore, the first and second neck mold halves 106,108 may each comprise a plurality of first and second individual neck mold halves 166,168, each directly and independently coupled to the first or second die set 74,76 respectively and each configured to define at least a portion of the exterior shape of the neck of only one of the parisons. Also, the first and second interlocking insert halves 110,112 may each comprise a plurality of first and second individual interlocking insert halves 170,172 each directly and independently coupled to the first or second die set 74,76 respectively. The individual body mold halves 162,164 may each be spaced apart from one another, the individual neck mold halves 166, 168 may each be spaced apart from one another, and/or the individual interlocking insert halves 170,172 may each be spaced apart from one another.

Each of the first individual body mold halves 162 may have a corresponding second individual body mold half 164, and each of the first individual neck mold halves 166 may have a corresponding second neck mold half 168. Each pair of corresponding first and second individual body mold halves 162, 164 may cooperatively defines the exterior shape of the body of one of the parisons, and each pair of corresponding first and second individual neck mold halves 166,168 may cooperatively define the exterior shape of the neck of one of the parisons. In some embodiments, the split parison mold of the injection station 46 may comprise at least two, four, or six of the first individual body mold halves 162,164 and at least two, four, or six of the second individual body mold halves 166, 168.

The individual first and second neck mold halves 166,168 may each have one of the mold half channels 128 formed therein and in fluid-flow communication with the heat transfer channels 84 in the first or second die set 74,76. For example, heat transfer fluid may flow from a first mold half channel in one individual first neck mold half to a second mold half channel in an adjacent individual first neck mold half via a connecting portion of one of the linear channels 122 or via one of the connecting heat transfer channels 134 in the first die set 74.

The injection molding process performed with the injection station 46 embodiment illustrated in FIGS. 20-23 is identical to the process performed with embodiments having primarily monolithic components, as in FIGS. 4-19. For example, the injection molding process may comprise moving the split parison mold assembly 78 from the open to the closed position, with the core rods 54 disposed within the parison cavities 86, then injecting resin into the plurality of parison cavities 86. Simultaneously, the heat transfer fluid may be passed through the heat transfer channels 84 throughout the injection station 46.

In some alternative embodiments of the injection station 46, at least some components of the first and second parison mold halves 80,82 may be monolithic while other components are comprised of a plurality of individual components. For example, the first and second body mold halves 102,104 may each be monolithic components while the first and second neck mold halves 106,108 may comprise a plurality of first individual neck mold halves 166 and a plurality of second individual neck mold halves 168.

In split parison mold configurations described above where at least some of the components of the split parison mold assembly 78 are independently coupled with the die sets 74,76 and are not directly coupled with each other, the IBM machine 42 may be reconfigured to produce different shapes and sizes of parisons and/or molded articles. For example, in an injection blow molding process, a first group of parisons may be injection molded at the injection station 46 using a first split parison mold assembly to define the exterior shape of the first group of parisons. The first group of parisons may then be blow molded into a first group of molded articles at the blowing station 48. Next, at least one component of the first split parison mold assembly may be replaced with another component, thus creating a second split parison mold assembly attached to the die sets. Then a second group of parisons may be injection molded at the injection station 46 using the second split parison mold assembly to define the exterior shape of the second group of parisons. The second group of parisons may then be blow molded into a second group of molded articles at the blowing station 48. The first and second groups of parisons may have different exterior shapes.

In some embodiments, the same blowing station 48 may be used to blow mold both the first and second groups of parisons into the first and second groups of molded articles respectively. Alternatively, the step of blow molding the first group of parisons may utilize a first blow mold assembly, such as a first upper mold half and a first lower mold half, to define the external shape of the first group of molded articles. Then the injection blow molding process may further comprise replacing the first blow mold assembly or the first upper and lower mold halves, with a second blow mold assembly, such as a second upper mold half and a second lower mold half. The second blow mold assembly may have a substantially different configuration than the first blow mold assembly. The step of blow molding the second group of parisons may thus utilize the second blow mold assembly, or second upper and lower mold halves, to define the external shape of the second group of molded articles. The first and second groups of molded articles have substantially different configurations.

As described above, the injection molding of the first and second groups of parisons may include passing heat transfer fluid through the heat transfer channels 84 defined within the injection station 46. The temperature of the heat transfer fluid introduced into the injection station 46 may be substantially the same during the injection molding of the first group of parisons and the second group of parisons.

This method of exchanging components of the split parison mold assembly 78 may be particularly useful in an initial design of the split parison mold and/or the blowing station 48. For example, if the first group of molded articles exhibits at least one undesirable characteristic, the second parison mold assembly may be configured to eliminate the undesirable characteristic in the second group of molded articles. Then the second parison mold assembly may replace the first parison mold assembly on the die sets 74,76. The undesirable characteristic may include excessive wall thickness, inadequate wall thickness, and/or non-uniform wall thickness.

The exchangeable first and second parison mold assemblies may present respective first and second parison neck-forming surfaces for defining the external shape of the necks of the parisons in the first and second groups of parisons respectively. Furthermore, the first and second parison mold assemblies may present respective first and second parison body-forming surfaces for defining the external shape of the bodies of the parisons in the first and second groups of parisons respectively.

During the injection molding of each of the first and second groups of parisons, the surface temperature of at least 70 percent of the total surface area of the first and second parison body-forming surfaces is maintain at a temperature within 20° F. of the target body surface temperature. For example, the target body surface temperature may be 210° F., or may be in any of the ranges disclosed herein for the target body surface temperature. In one embodiment, during the injection molding of each of the first and second groups of parisons, the surface temperature of at least 90 percent of the total surface area of the first and second parison body-forming surfaces may be maintained in the range of 205 to 215° F. Furthermore, during the injection molding of each of the first and second groups of parisons, the temperature of at least 90 percent of the total surface area of the parison neck-forming surfaces may be maintained between 75 and 150° F.

FIGS. 24-27 provide details of an injection station 46 configured in accordance with a third embodiment of the present invention. In the injection station 46 of FIGS. 24-27, the split parison mold assembly 210 includes a series of multi-cavity split mold blocks, each defining a plurality of parison cavities. As shown in FIG. 25 each multi-cavity split mold half block 212 or 214 can have one or more heat transfer channels 216 extending through the mold block adjacent the parison-forming surfaces 218. This is in contrast the embodiments depicted in FIGS. 4-23, which do not employ heat transfer channels in the parison molds adjacent the body-forming surface of the parison cavity.

Each of the interior multi-cavity split mold half blocks 212, 214 depicted in FIG. 24 is independently coupled to the upper or lower die set 74, 76 using four bolts 220 and two dowels 222. A gap is provided between adjacent mold half blocks 212 or 214 to allow for thermal expansion. The gap is also sized to permit an o-ring seal to be inserted between the mold half blocks 212 or 214 during assembly, so that the heat transfer channels of adjacent blocks communicate with one another without leakage. The flexibility of the seal allows for thermal expansion of the blocks 212, 214 without leakage of heat transfer fluid.

As shown in FIGS. 24 and 27, an end plate 224, 225 is provided at the end of the series of upper and lower parison mold halves 212, 214. The end plates 224, 225 are equipped with heat transfer fluid connections 226 for circulating heat transfer fluid through the split parison molds. As depicted in FIG. 27, a horizontally-extending bolt 228 connects each end plate 224, 225 with an adjacent single-cavity mold half 230, 232 and an outer multi-cavity mold half block 212, 214, thereby securing them to one another. Therefore, the outer multi-cavity mold half blocks 212, 214 and the single-cavity mold halves 230, 232 are not independently connected to the die sets 74, 76, but require disconnection of the horizontally extending bolts 228 in order to be disconnected from the die sets 74, 76.

In certain embodiments of the present inventions there is provided a split parison mold assembly 210 configured for connection to upper and lower die sets 74, 76 of an injection blow molding system. The split parison mold assembly 210 comprises a plurality of pairs of upper and lower multi-cavity parison mold half blocks 212, 214. Each pair of the mold half blocks 212, 214 is configured to cooperatively define a plurality of parison forming cavities. At least two adjacent lower multi-cavity mold half blocks 214 are spaced apart from one another and at least two adjacent upper multi-cavity mold half blocks 212 are spaced apart from one another.

In certain embodiments, each of the upper and lower mold half blocks 212, 214 defines at least one heat transfer channel 216 extending therethrough.

In certain embodiments, the split mold assembly 210 further comprising at least one flexible lower seal disposed in the space between the at least two adjacent lower multi-cavity mold half blocks 214, further comprising at least one flexible upper seal disposed in the space between the at least two adjacent upper multi-cavity mold half blocks 212. In certain embodiments, the lower seals provide fluid flow communication between the heat transfer channels 216 of the at least two adjacent lower multi-cavity mold half blocks 214 and the upper seals provide fluid flow communication between the heat transfer channels 216 of the at least two adjacent upper multi-cavity mold half blocks 214. In certain embodiments, the lower and upper seals are O-ring seals. In certain embodiments, at least one of the lower multi-cavity mold half blocks 214 is configured for independent connection to the lower die set 76 by one or more vertically-extending lower fasteners 220, 222 and at least one of the upper multi-cavity mold half blocks 212 is configured for independent connection to the upper die set 74 by one or more vertically extending upper fasteners 220, 222.

In certain embodiments, each of the upper and lower mold half blocks 212, 214 includes a plurality of vertically-extending bores configured to receive vertically-extending die set fasteners 220, 222. In certain embodiments, the vertically-extending bores include a plurality of threaded bores for receiving threaded bolts 220 and a plurality of unthreaded bores for receiving unthreaded dowels 222. In certain embodiments, wherein each of the upper and lower mold half blocks 212, 214 comprises four of the threaded bores and two of the unthreaded bores.

In certain embodiments, the split mold assembly 210 further comprising two or more pair of upper and lower single-cavity mold halves 230, 232. Each pair of upper and lower single-cavity mold halves 230, 232 cooperatively defines one parison cavity. In certain embodiments, all of the upper multi-cavity mold half blocks 212 are positioned between two of the upper single-cavity mold halves 230 and all of the lower multi-cavity mold half blocks 214 are positioned between two of the lower single-cavity mold halves 232. In certain embodiments, the upper multi-cavity mold half blocks 212 include two outer upper multi-cavity mold half blocks 212 each positioned adjacent one of the upper single-cavity mold halves 230 and the lower multi-cavity mold half blocks 214 include two outer lower multi-cavity mold half blocks 214 each positioned adjacent one of the lower single-cavity mold halves 232. The split parison mold 210 further comprises a plurality of horizontally-extending fasteners 228 for coupling each of the outer multi-cavity mold half blocks 212, 214 to respective adjacent single-cavity mold halves 230, 232.

In certain embodiments, the split parison mold 210 further comprises a plurality of upper and lower end plates 224, 225, each coupled to one of the single-cavity mold halves via one or more of the horizontally-extending fasteners. In certain embodiments, the split parison mold 210 further comprises at least one heat transfer fluid connection 226 coupled to each end plate 224, 225.

In certain embodiments, each pair of the mold half blocks 212, 214 and 230, 232 is configured to cooperatively define at least 2, 3, or 4 and/or not more than 10, 8, or 6 parison forming cavities.

In certain embodiments, the split parison mold 210 comprises at least 2, 4, 6, or 8 and/or not more than 40, 20, 16, or 12 pair of the upper and lower mold half blocks 212, 214 and 230, 232.

In certain embodiments, the split parison mold 210 comprises least 10, 15, 20, 25, or 30 and/or not more than 100, 75, 50, or 40 parison forming cavities.

In certain embodiments, the at least two adjacent lower multi-cavity mold half blocks 214 are spaced from one another by a distance of at least 0.001, 0.005, or 0.0075 inch and/or not more than 0.5, 0.1, 0.05, 0.02, or 0.015 inch and the at least two adjacent upper multi-cavity mold have blocks 212 are spaced from one another by a distance of at least 0.001, 0.005, or 0.0075 inch and/or not more than 0.5, 0.1, 0.05, 0.02, or 0.015 inch.

In certain embodiments, no heat transfer channels are located in the die sets 74, 76.

In certain embodiments of the present invention there is provided a split parison mold assembly 210 configured for connection to upper and lower die sets 74, 76 of an injection blow molding system. The split parison mold assembly 210 comprises a plurality of pairs of upper and lower multi-cavity parison mold half blocks 212, 214. Each pair of the mold half blocks 212, 214 are configured to cooperatively define a plurality of parison forming cavities. At least two of the lower multi-cavity mold half blocks 214 are configured for independent connection to the lower die set 76 by one or more vertically extending lower fasteners 220, 222. At least two of the upper multi-cavity mold half blocks 212 are configured for independent connection to the upper die set 74, 76 by one or more vertically extending upper fasteners 220, 222.

In certain embodiments of the present invention there is provided an injection blow molding system for injection molding a resin into a plurality of parisons and blow molding the parisons into a plurality of molded articles. The injection blow molding system comprises an injection station 46 for injection molding the resin into the parisons, a blowing station 48 for blow molding the parisons into the molded articles, and an indexing head 44 for transferring the parisons from the injection station 46 to the blowing station 48. The injection station 46 comprises upper and lower die sets 74, 76 shiftable between an open position and a closed position. The injection station 46 further comprises a plurality of upper multi-cavity parison mold half blocks 212 coupled to the upper die set 74 and spaced apart from one another. The injection station 46 further comprises a plurality of lower multi-cavity parison mold half blocks 214 coupled to the lower die set 76 and spaced apart from one another. Each of the upper multi-cavity parison mold half blocks 212 has a corresponding lower multi-cavity parison mold half block 214. Each pair of corresponding upper and lower mold half blocks 212, 214 cooperatively defines the exterior shape of the bodies of at least two of the parisons.

In certain embodiments of the present invention there is provided an injection blow molding system for injection molding a resin into a plurality of parisons and blow molding the parisons into a plurality of molded articles. The injection blow molding system comprises an injection station 46 for injection molding the resin into the parisons, a blowing station 48 for blow molding the parisons into the molded articles, and an indexing head 44 for transferring the parisons from the injection station 46 to the blowing station 48. The injection station 46 comprises upper and lower die sets 74, 76 shiftable between an open position and a closed position. The injection station 46 further comprises a plurality of upper multi-cavity parison mold half blocks 212 independently coupled to the upper die set 74. The injection station 46 further comprises a plurality of lower multi-cavity parison mold half blocks 214 independently coupled to the lower die set 76. Each of the upper multi-cavity parison mold half blocks 212 has a corresponding lower multi-cavity parison mold half block 214. Each pair of corresponding upper and lower mold halve blocks 212, 214 cooperatively defines the exterior shape of the bodies of at least two of the parisons.

In certain embodiments of the present invention there is provided an injection blow molding process comprising: (a) injection molding a resin into a plurality of parisons at an injection station 46, wherein the injection molding includes—(i) shifting upper and lower die sets 74, 76 of the injection molding station 46 from an open position to a closed position, (ii) injecting the resin into a plurality of parison cavities cooperatively defined by upper and lower mold half assemblies 212 and 230 coupled to the upper and lower die sets 74, 76 respectively, wherein the upper mold half assembly comprises a plurality of upper mold half blocks 212 independently coupled to the upper die set 74, wherein the lower mold half assembly comprises a plurality of lower mold half blocks 214 independently coupled to the lower die set 76, wherein each of the upper mold half blocks 212 has a corresponding lower mold half block 214 for cooperatively defining the exterior shape of the bodies of at least two one of the parisons; (b) transferring the parisons from the injection station 46 to a blowing station 48; and c) blow molding the parisons into molded articles at the blowing station 48.

FIGS. 28-37 show the injection station 46 configured in accordance with another embodiment of the invention that is closely similar in many respects to the embodiment of FIGS. 24-27 but also differs in certain details. In FIGS. 28-37 the split parison mold assembly 250 has a line of upper mold half blocks 252 secured to the upper die set 74 (not shown in FIGS. 28-37) and a line of lower mold half blocks 254 secured to the lower die set 76. All of the upper mold half blocks 252 are configured to be each independently secured to upper die set 74, and all of the lower mold half blocks 254 are configured to be each independently secured to lower die set 76.

At least certain of the upper mold half blocks 252 are multi-cavity mold half blocks 252*a* and a corresponding certain of the lower mold half blocks 254 are multi-cavity mold half blocks 254*a*. In the illustrated embodiment, all of the blocks in the line of upper blocks 252 comprise multi-cavity blocks 252*a*, except for a pair of single-cavity mold half blocks 252*b* at opposite ends of the line of upper blocks 252. Similarly, all of the blocks in the line of lower blocks 254 are multi-cavity blocks 254*a*, except for a pair of single-cavity blocks 254*b* at opposite ends of the line of lower blocks 254. Depending upon the number of mold cavities desired for a particular set of tooling, however, this arrangement can vary widely. For example, all of the upper and lower mold half blocks 252, 254 could be multi-cavity, or all could be single-cavity. Within each line, multi-cavity blocks could be interspersed with single-cavity blocks, or the number of cavities in adjacent multi-cavity blocks could differ. In the illustrated embodiment, each cooperating pair of upper and lower multi-cavity blocks 252*a*, 254*a* happens to be configured to present a total of four side-by-side parison cavities when die sets 74, 76 are in the closed position. Of course, each cooperating pair of upper and lower single-cavity blocks 252*b*, 254*b* is configured to present one single parison cavity when die sets 74, 76 are in the closed position. Thus, in the particular illustrated embodiment, there are thirty-eight cavities in total.

The concept of independently securing each mold half block 252*a*, 252*b* and 254*a*, 254*b* to its respective die set 74 or 76 allows all of the mold half blocks 252 or 254 in each line to be slightly spaced from one another, if desired. Even if the endmost mold half blocks in each line are single-cavity mold half blocks such as blocks 252*b* and 254*b* in the illustrated embodiment, it is still preferred that such endmost single-cavity blocks 252*b* and 254*b* be spaced slightly from their next adjacent multi-cavity blocks 252*a* and 254*a*. A gap in the range of 0.001 to 0.0075 inch is preferred. In some embodiments, a gap of not more than 0.5 to 0.015 is acceptable. FIG. 37 shows typical gaps 256 between a pair of adjacent multi-cavity upper mold half blocks 252*a* and between a pair of adjacent multi-cavity lower mold half blocks 254*a*.

Preferably, but not necessarily, all of the upper and lower mold half blocks 252, 254 are secured to their respective upper and lower die sets 74, 76 by vertical bolts and dowels. Thus, each multi-cavity block 252*a* and 254*a* preferably has four vertical threaded bores 258 at its four corners that threadably receive four corresponding vertical bolts 260 in vertical bores 262 in the die sets 74, 76. Similarly, each single-cavity block 252*b* and 254*b* preferably has two vertical threaded bores 258 adjacent its opposite ends that threadably receive two corresponding vertical bolts 260 in vertical bores 262 in the die sets 74, 76. Each multi-cavity block 252*a* and 254*a* also preferably has a pair of unthreaded vertical bores 264 into which are fitted a pair of corresponding vertical dowels 266 that project into vertical unthreaded bores 268 in the die sets 74, 76. Likewise, each single-cavity block 252*b* and 254*b* preferably has a pair of unthreaded vertical bores 264 into which are fitted a pair of corresponding vertical dowels 266 that project into vertical unthreaded bores 268 in the die sets 74, 76.

The upper and lower mold half blocks 252, 254 are each preferably provided with at least one heat transfer fluid channel extending therethrough for cooling the parison being formed within the mold cavity. In the illustrated embodiment, as shown in FIG. 29 for example, a total of four heat transfer fluid channels 270, 272, 274, and 276 happen to be provided. In the particular embodiment shown and described, two of the channels 270, 272 are positioned for cooling of the body portion of the parison being formed, while the two remaining channels 274, 276 are positioned for cooling of the neck portion of the parison being formed. For convenience, the neck portion of each cavity half may be defined within a removable insert 278 that is bolted in place within the remaining part of the mold half block 252 or 254 by a pair of vertical bolts 280. All multi-cavity mold blocks 252a, 254a and single-cavity mold blocks 252b, 254b are constructed in the same way insofar as fluid channels 270-276 and neck inserts 278 are concerned. Preferably, flexible seals in the nature of O-rings 282 (FIG. 37) are provided in the gap 256 between adjacent spaced apart upper mold half blocks 252 and adjacent spaced apart lower mold half blocks 254 to establish communication between the fluid channels 270-276 of the adjacent blocks.

The upper line of mold half blocks 252 is provided with a pair of cavity-free end plates 284 at its opposite ends. Likewise, the lower line of mold half blocks 254 is provided with a pair of cavity-free end plates 286 at its opposite ends. In each instance, the end plates 284, 286 are bolted up against their next adjacent single-cavity mold half block 252b or 254b by a pair of horizontal bolts 288 that terminate within the single-cavity mold half block 252b or 254b and do not extend into the neighboring multi-cavity mold half block 252a or 254a. Preferably, each end plate 284, 286 is also bolted to its upper or lower die set 74, 76 by a pair of vertical bolts (not shown). A pair of threaded bores 290 for the end plate vertical bolts are shown for the upper end plate 284 in FIG. 29.

Each end plate 284, 286 is provided with four fittings or fluid connections 292, 294, 296, and 298 that communicate with the fluid channels 270, 272, 274, and 276 respectively of mold half blocks 252, 254 via internal passages (not shown) within the end plate. Fluid connections 292-298 are adapted to be coupled to one or more sources of heat exchange fluid via appropriate hoses (not shown). Although die sets 74, 76 may be provided with their own heat exchange fluid channels 300 as in the embodiments of FIGS. 1-23, there is no transfer of heat exchange fluid from die sets 74, 76 to mold half blocks 252, 254 for cooling neck cavities in contrast to certain embodiments of FIGS. 1-23.

Except as described above and shown in FIGS. 28-37, the embodiment of FIGS. 28-37 is the same as that of FIGS. 24-27, and the injection molding process carried out with respect to FIGS. 28-37 is the same as well.

Although the invention has been described with reference to the preferred embodiment illustrated in the attached drawing figures, it is noted that equivalents may be employed and substitutions made herein without departing from the scope of the invention as recited in the claims.

The invention claimed is:

1. A split parison mold assembly for forming a parison with an injection blow molding system, said assembly comprising:
    one or more pairs of upper and lower multi-cavity parison mold half blocks, wherein each pair of said mold half blocks comprises an upper body mold half and a lower body mold half and an upper neck mold half and a lower neck mold half,
    wherein said upper and lower body mold halves cooperatively define body portions of a plurality of parison forming cavities,
    wherein said upper and lower neck mold halves cooperatively define neck portions of the plurality of parison forming cavities,
    wherein said upper body mold half and said upper neck mold half are at least partially separated by an upper insulating gap,
    wherein said lower body mold half and said lower neck mold half are at least partially separated by a lower insulating gap.

2. The split parison mold assembly as claimed in claim 1, wherein each of said upper and lower multi-cavity parison mold half blocks comprises a single monolithic unit.

3. The split parison mold assembly as claimed in claim 1, comprising two or more pairs of upper and lower multi-cavity parison mold half blocks.

4. The split parison mold assembly as claimed in claim 3, wherein each of said upper mold half blocks are spaced apart from one another, and each of said lower mold half blocks are spaced apart from one another.

5. The split parison mold assembly as claimed in claim 1, wherein said neck mold halves can be decoupled from the system without decoupling said body mold halves from the system.

6. The split parison mold assembly as claimed in claim 1, wherein each of said upper and lower neck mold halves defines a contoured heat transfer channel having a curvature that substantially corresponds to the curvature of the neck portions of said parison forming cavities.

7. The split parison mold assembly as claimed in claim 6, further comprising upper and lower interlock inserts, wherein said upper and lower neck mold halves are disposed between said upper and lower interlock inserts and said upper and lower body mold halves respectively, wherein each of said contoured heat transfer channels is cooperatively defined by one of said neck mold halves and one of said interlock inserts.

8. A split parison mold assembly for forming a parison with an injection blow molding system, said assembly comprising:
    two or more pairs of upper body mold halves and lower body mold halves,
    wherein each of said pairs of upper and lower body mold halves cooperatively presents a body cavity configured to define an exterior shape of a body of the parison,
    two or more pairs of upper neck mold halves and lower neck mold halves,
    wherein each of said pairs of upper and lower neck mold halves cooperatively present a neck cavity configured to define an exterior shape of a neck of the parison,
    wherein said upper body mold half and said upper neck mold half are at least partially spaced apart by an upper insulating gap,
    wherein said lower body mold half and said lower neck mold half are at least partially spaced apart by a lower insulating gap.

9. The split parison mold assembly as claimed in claim 8, wherein each of said upper and lower body mold halves and each of said upper and lower neck mold halves comprise a single monolithic unit.

10. The split parison mold assembly as claimed in claim 8, wherein each of said upper mold halves are spaced apart from one another, and each of said lower mold halves are spaced apart from one another, wherein each of said upper neck mold halves are spaced apart from one another, and each of said lower neck mold halves are spaced apart from one another.

11. The split parison mold assembly as claimed in claim 8, wherein said neck mold halves can be decoupled from the system without decoupling said body mold halves from the system.

12. The split parison mold assembly as claimed in claim 8, wherein each of said upper and lower neck mold halves defines a contoured heat transfer channel having a curvature that substantially corresponds to the curvature of the necks of said parisons.

13. The split parison mold assembly as claimed in claim 12, further comprising upper and lower interlock inserts, wherein said upper and lower neck mold halves are disposed between said upper and lower interlock inserts and said upper and lower body mold halves respectively, wherein each of said contoured heat transfer channels is cooperatively defined by one of said neck mold halves and one of said interlock inserts.

14. An injection blow molding process comprising:
(a) injection molding a resin into a plurality of parisons at an injection station, wherein said injection molding includes—
  (i) shifting upper and lower die sets of said injection molding station from an open position to a closed position,
  (ii) injecting said resin into a plurality of parison cavities cooperatively defined by one or more pairs of upper and lower multi-cavity parison mold half blocks coupled to said upper and lower die sets respectively, wherein each pair of said mold half blocks comprises an upper body mold half and a lower body mold half and an upper neck mold half and a lower neck mold half, wherein said upper and lower body mold halves cooperatively define body portions of the parison forming cavities, wherein said upper and lower neck mold halves cooperatively define neck portions of the parison forming cavities, wherein said upper body mold half and said upper neck mold half are at least partially spaced apart by an upper insulating gap, wherein said lower body mold half and said lower neck mold half are at least partially spaced apart by a lower insulating gap;
(b) transferring said parisons from said injection station to a blowing station; and
(c) blow molding said parisons into molded articles at said blowing station,
wherein each of said upper and lower mold half blocks comprises a single monolithic unit.

15. The process as claimed in claim 14, wherein said neck mold halves can be decoupled from the die sets without decoupling said body mold halves from the die sets.

16. The process as claimed in claim 14, wherein each of said upper and lower neck mold halves defines a contoured heat transfer channel having a curvature that substantially corresponds to the curvature of neck portions of said parisons.

17. The process as claimed in claim 16, further comprising upper and lower interlock inserts, wherein said upper and lower neck mold halves are disposed between said upper and lower interlock inserts and said upper and lower body mold halves respectively, wherein each of said contoured heat transfer channels is cooperatively defined by one of said neck mold halves and one of said interlock inserts.

\* \* \* \* \*